US012331886B2

(12) United States Patent
Poorman et al.

(10) Patent No.: US 12,331,886 B2
(45) Date of Patent: Jun. 17, 2025

(54) SYSTEM AND METHOD FOR PRIORITY CNG FILLING

(71) Applicant: J-W Power Company, Addison, TX (US)

(72) Inventors: Richard Allan Poorman, Diana, TX (US); Bradley Wade Fontenot, Longview, TX (US)

( * ) Notice: Subject to any disclaimer, the term of this patent is extended or adjusted under 35 U.S.C. 154(b) by 0 days.

(21) Appl. No.: 17/677,965

(22) Filed: Feb. 22, 2022

(65) Prior Publication Data

US 2022/0252222 A1 Aug. 11, 2022

Related U.S. Application Data

(63) Continuation-in-part of application No. 16/219,403, filed on Dec. 13, 2018, now Pat. No. 11,255,485.

(60) Provisional application No. 62/598,421, filed on Dec. 13, 2017.

(51) Int. Cl.
*F17C 5/00* (2006.01)
*F17C 5/06* (2006.01)
*F17C 7/00* (2006.01)

(52) U.S. Cl.
CPC ................ *F17C 5/007* (2013.01); *F17C 5/06* (2013.01); *F17C 7/00* (2013.01); *F17C 2205/0138* (2013.01); *F17C 2205/0323* (2013.01); *F17C 2221/033* (2013.01); *F17C 2227/0157* (2013.01); *F17C 2250/032* (2013.01); *F17C 2265/065* (2013.01); *F17C 2270/0168* (2013.01)

(58) Field of Classification Search
CPC .......... F17C 5/06; F17C 5/007; F17C 13/025; F17C 2221/033; F17C 2223/0123; F17C 2265/065; F17C 2250/032; F17C 2250/0443; F17C 2250/0473; F17C 2250/0323; F17C 2225/0123
USPC ................................................. 141/3, 18, 20
See application file for complete search history.

(56) References Cited

U.S. PATENT DOCUMENTS

| | | | | |
|---|---|---|---|---|
| 5,207,530 | A | 5/1993 | Brooks et al. | |
| 5,259,424 | A * | 11/1993 | Miller | F17C 5/007 702/50 |
| 5,406,988 | A | 4/1995 | Hopkins | |
| 5,409,046 | A | 4/1995 | Swenson et al. | |
| 5,513,678 | A | 5/1996 | Schultz et al. | |
| 5,538,051 | A * | 7/1996 | Brown | F17C 5/06 141/18 |
| 5,676,180 | A | 10/1997 | Teel | |
| 9,933,114 | B2 * | 4/2018 | Thiessen | F17C 5/06 |
| 10,400,954 | B2 | 9/2019 | Okuno et al. | |
| 10,551,001 | B2 * | 2/2020 | Poorman | F17C 5/06 |
| 10,648,618 | B2 | 5/2020 | Uchida et al. | |
| 11,255,485 | B2 * | 2/2022 | Poorman | F17C 5/06 |
| 2006/0086406 | A1 | 4/2006 | Sato et al. | |
| 2006/0185756 | A1 | 8/2006 | Sato et al. | |

(Continued)

*Primary Examiner* — Timothy L Maust
(74) *Attorney, Agent, or Firm* — Lightfoot & Alford PLLC

(57) ABSTRACT

A method of dispensing compressed natural gas (CNG) includes assigning a first priority to the filling of a first destination tank and assigning a second priority to the filling of a second destination tank. The second priority is lower than the first priority. The method also includes filling the first destination tank from a first CNG source while filling the second destination tank from a second CNG source. The second CNG source provides CNG at a lower pressure relative to the pressure at which the first CNG source provides CNG.

18 Claims, 41 Drawing Sheets

(56) References Cited

U.S. PATENT DOCUMENTS

| | | | |
|---|---|---|---|
| 2007/0034283 A1 | 2/2007 | Plummer et al. | |
| 2012/0031525 A1 | 2/2012 | Wonders | |
| 2012/0105253 A1 | 5/2012 | Lillis et al. | |
| 2014/0263420 A1 | 9/2014 | Lambrix et al. | |
| 2014/0352840 A1 | 12/2014 | Blanchet | |
| 2015/0116811 A1 | 4/2015 | Shrivastava et al. | |
| 2016/0116113 A1 | 4/2016 | Mrowzinski | |
| 2016/0123536 A1 | 5/2016 | Grimmer et al. | |
| 2016/0245459 A1 | 8/2016 | Grimmer et al. | |
| 2017/0023180 A1* | 1/2017 | Petit | F16K 15/023 |
| 2017/0045182 A1 | 2/2017 | Poorman et al. | |
| 2017/0130901 A1 | 5/2017 | Sloan et al. | |
| 2018/0292050 A1* | 10/2018 | Thiessen | F17C 5/06 |
| 2018/0320825 A1 | 11/2018 | Ouerd et al. | |
| 2021/0317952 A1* | 10/2021 | Allidieres | F17C 5/06 |

* cited by examiner

128

128

128

128

128

SYSTEM AND METHOD FOR PRIORITY CNG FILLING

CROSS-REFERENCE TO RELATED APPLICATIONS

This patent application claims the benefit of the filing date of U.S. patent application Ser. No. 16/219,403 filed on 13 Dec. 2018 and entitled "SYSTEM AND METHOD FOR PRIORITY CNG FILLING" which claims the benefit of U.S. Provisional Patent Application Ser. No. 62/598,421 filed on 13 Dec. 2017 and entitled "SYSTEM AND METHOD FOR PRIORITY CNG FILLING," the entire content of both being hereby expressly incorporated by reference.

BACKGROUND

Some compressed natural gas (CNG) filling stations comprise multiple dispensers. However, current filling stations that utilize multiple dispensers make little or no effort to ensure that a first arriving customer is able to fill their vehicle's tank first relative to later arriving customer and/or later initiated vehicle tank filling. Instead, current filling stations allow later initiated vehicle tank filling instances to prolong the period of time it takes to fill the first arriving customer's vehicle tank and sometimes the later arriving customer's vehicle tank is allowed to complete filling at substantially the same time as the first arriving customer's vehicle tank is finished filling.

Filling a vehicle with a gaseous fuel is done based on differential pressure. The source pressure (storage) is higher than the vehicle pressure (tank). This causes the gas to flow from the storage to the tank and equalize pressure. Based on this, many CNG stations have adopted a multi-bank storage system commonly referred to as a cascade. In many cases there is a 3-bank cascade. In such a system, the storage bank (called Low) is opened to the vehicle first and the tank is allowed to approach equalization pressure with the storage. As the two pressures approach each other (storage dropping and tank increasing), the flow rate is reduced (because of the reduced differential pressure). At some predetermined flow rate, the vehicle is connected to a Mid bank of storage. Again, the storage and tank are allowed to approach equalization pressure. In most systems, the vehicle will remain connected to Low, but based on the fact that Mid is a higher pressure than Low storage, gas will only flow from Mid. Once the flow rate drops below a predetermined value, the vehicle is connected to High bank. The storage and the tank are allowed to equalize until the vehicle is considered full. At this time the filling cycle ends and the vehicle is be disconnected from all the banks.

The above scenario is used with any multitude of dispensers connected to one set of storage. What this means, is that there is the potential for multiple vehicles to be on any one bank at a time. Based on the pressure in storage, size of storage, vehicle capacity, line size etc, a first vehicle may lose enough flow to advance to the Mid bank. A similar situation can occur on the Mid bank. A troubling situation is when a vehicle is on High bank, having already advanced through low and mid. If vehicle 1 is at 2500 psig and vehicle 2 is at 2000 psig, more (or all) of the flow will go to vehicle 2 from High bank until vehicle 2 reaches the 2500 psig pressure. Accordingly, both vehicle 1 and 2 will finish the fills at the same time. Unfortunately, the fill times of vehicle 1 is extended to the end of the fill of subsequent arriving vehicles that are connected to the High bank. This may cause the dispenser to time out (on no flow) while the system is filling other vehicles on the High bank. In addition, this scenario causes vehicles to prematurely advance off of Low and Mid banks because of other vehicles, thereby underutilizing the Low and Mid banks of storage.

Many different control strategies have been developed in order to better control the filling from these cascade systems. They include adding valves upstream of the dispensers to divert flow, adding bypass loops to make flow go to a particular dispenser, adding valves to restrict flow to lower priority vehicles etc. However, the conventional solutions do not use existing hardware (dispensers and valves) to provide a true first in first out solution.

BRIEF DESCRIPTION OF THE DRAWINGS

For a more complete understanding of the present disclosure and the advantages thereof, reference is now made to the following brief description, taken in connection with the accompanying drawings and detailed description.

DETAILED DESCRIPTION

In some cases, it may be desirable to provide a CNG dispensing system capable of speedily refueling a vehicle tank while limiting the affect that simultaneously dispensing to other vehicle tanks has on the overall time required to complete the desired filling of the vehicle tank initially being filled.

Figure 1:
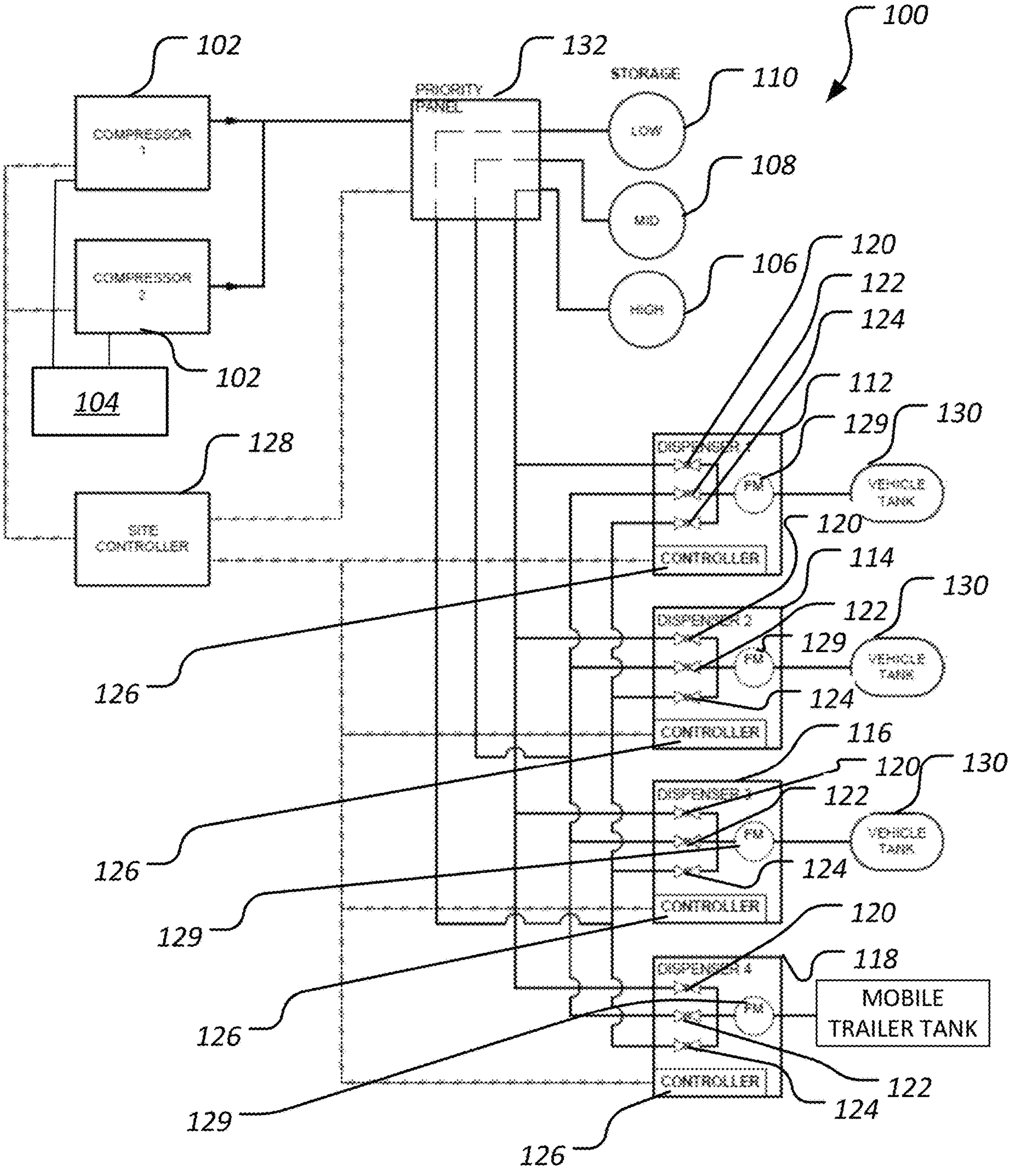
FIG. 1 is a schematic diagram of a CNG dispensing system according to an embodiment of the disclosure.

Referring now to FIG. 1, a schematic of a CNG dispensing system 100 is shown according to an embodiment of the disclosure. The CNG dispensing system 100 may generally comprise one or more compressors 102, a natural gas source 104, a first storage tank 106, a second storage tank 108, and a third storage tank 110. The storage tanks 106, 108, 110, are sometimes referred to as High, Mid, and Low, respectively, when, during filling of a vehicle tank 130, the relative pressure of the first storage tank 106 has a higher pressure than the pressure of both the second storage tank 108 and the third storage tank 110, the second storage tank 108 has a pressure between the pressure of the first storage tank 106 and the third storage tank 110, and when the third storage tank 110 has a pressure lower than both the first storage tank 106 and the second storage tank 108. However, it will be appreciated that more or fewer storage tanks can be utilized and that although the storage tanks 106, 108, 110 are described as having relatively different pressures, they may each be initially pressurized to a same high pressure prior to a differential being created by using them at different rates to fill vehicle tanks. The CNG dispensing system 100 further comprises a plurality of dispensers, namely, a first dispenser 112, a second dispenser 114, a third dispenser 116, and a fourth dispenser 118.

Each dispenser 112, 114, 116, 118 is in selective fluid communication with each of the storage tanks 106, 108, 110 and such fluid communication can be allowed and disallowed by actuation of a first valve 120, second valve 122, and third valve 124, to manage fluid communication with the storage tanks 106, 108, 110, respectively. Each dispenser 112, 114, 116, 118 further comprises a dispenser controller 126 configured for communication with a site controller 128. The site controller 128 is configured to communicate with the dispensers 112, 114, 116, 118 to receive and/or send indications of priority assignment and/or to effectuate control over the valves 120, 122, 124 so that vehicle tanks 130 can be filled in a predictable, preset, rules-based, and/or fair order based, in some cases, at least partially on the order in which vehicle tanks 130 begin being filled with CNG. Each dispenser 112, 114, 116, 118 further comprises a flow meter 129 configured to measure and/or communicate flow of CNG from the dispensers to the vehicle tanks 130. The site controller 128 may be configured further configured to communicate with the compressors 102 and a priority panel 132. The priority panel 132 comprises fluid circuits and valving necessary to selectively direct CNG from the compressors 102 to desired ones of the storage tanks 106, 108, 110. It will be appreciated that in alternative embodiments, a CNG dispensing system may provide a site controller configured to additionally perform the functions of the above-described dispenser controller 126. In other alternative embodiments, a CNG dispensing system may provide a dispenser controller configured to additionally perform the function of the above-described site controller 128. Still further, in alternative embodiments, the controlling of dispensers may be conducted remotely from the remainder of the system so that control decisions are made remotely and transmitted over a control network.

Referring now to FIGS. 2A, 3A, 4A, 5A, 6A, 7A, 8A, 9A, 10A, 11A, 12A, 13A, 14A, 15A, 16A, 17A, and 18A, a display of site controller 128 is shown at various steps of a method of prioritized CNG dispensing using a CNG dispsensing system 200 that is substantially similar to system 100. The site controller 128 is shown as being used with a CNG dispensing system 200 that is capable of managing priority and CNG filling of eight vehicle tanks 130, rather than four as shown in FIG. 1. For clarity, valves and vehicle tanks are not all labeled.

Figure 2A:
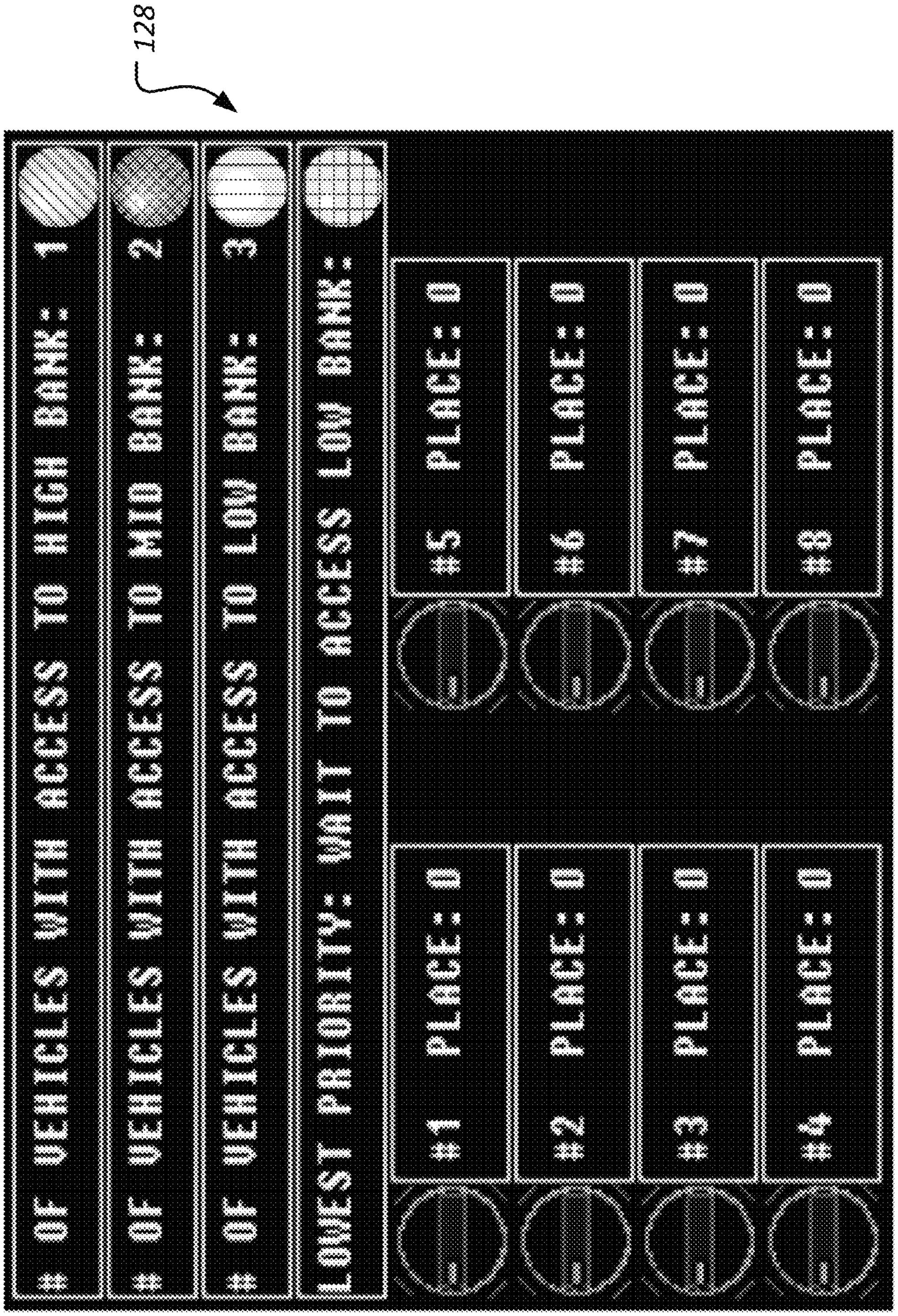
FIGS. 2A, 3A, 4A, 5A, 6A, 7A, 8A, 9A, 10A, 11A, 12A, 13A, 14A, 15A, 16A, 17A, and 18A show the status of a CNG dispensing over the course of many steps of a method of prioritized CNG dispensing according to an embodiment of the disclosure.
Figure 2B:
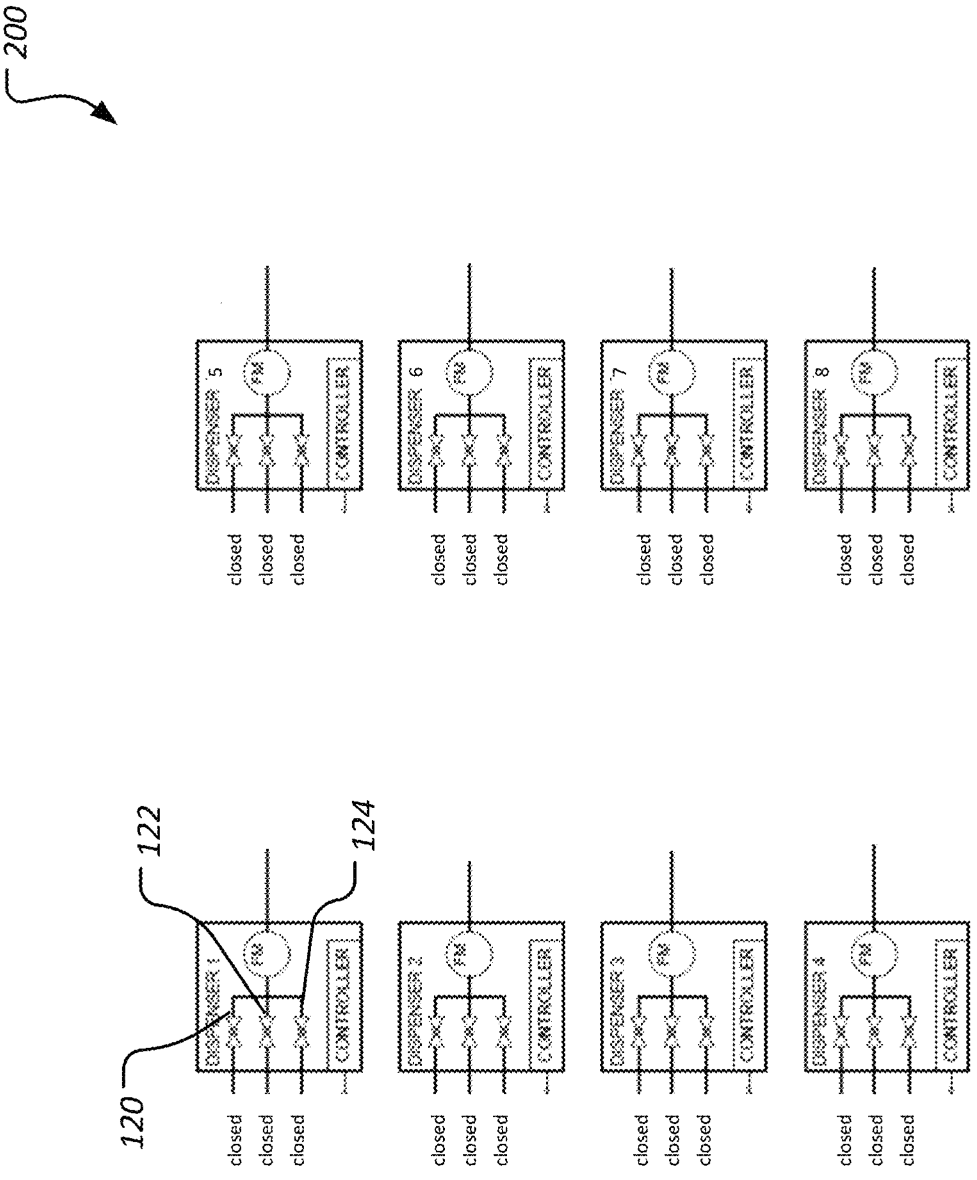
FIGS. 2B, 3B, 4B, 5B, 6B, 7B, 8B, 9B, 10B, 11B, 12B, 13B, 14B, 15B, 16B, 17B, and 18B show the physical layout of CNG dispensing over the course of the steps of the method of prioritized CNG dispensing associated with FIGS. 2A, 3A, 4A, 5A, 6A, 7A, 8A, 9A, 10A, 11A, 12A, 13A, 14A, 15A, 16A, 17A, and 18A, respectively.

The display of site controller 128 of FIG. 2A and the physical layout of FIG. 2B show that no vehicle tanks 130 are currently being filled with CNG or are waiting to be filled with CNG.

Figure 3A:
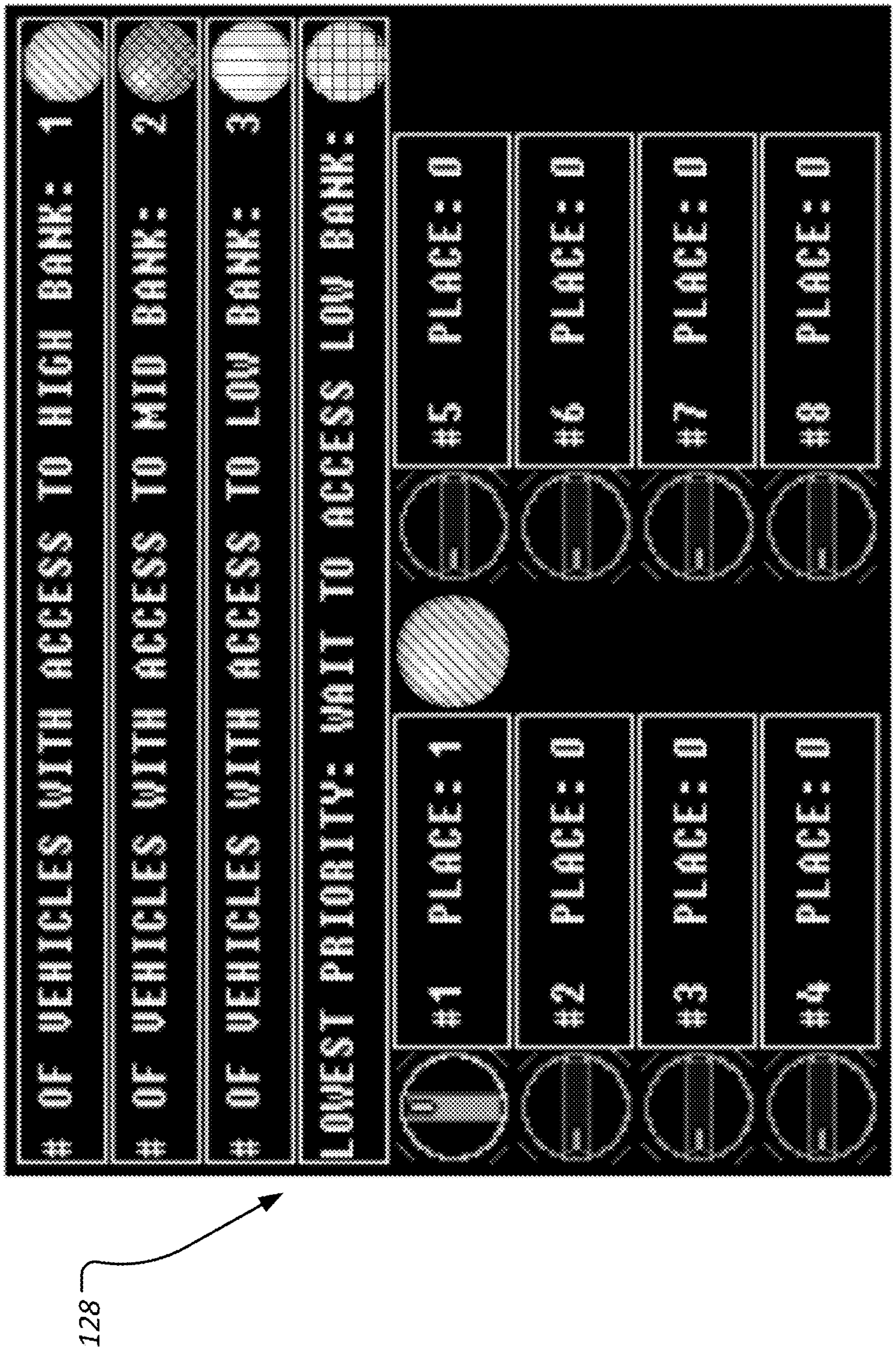
Figure 3B:
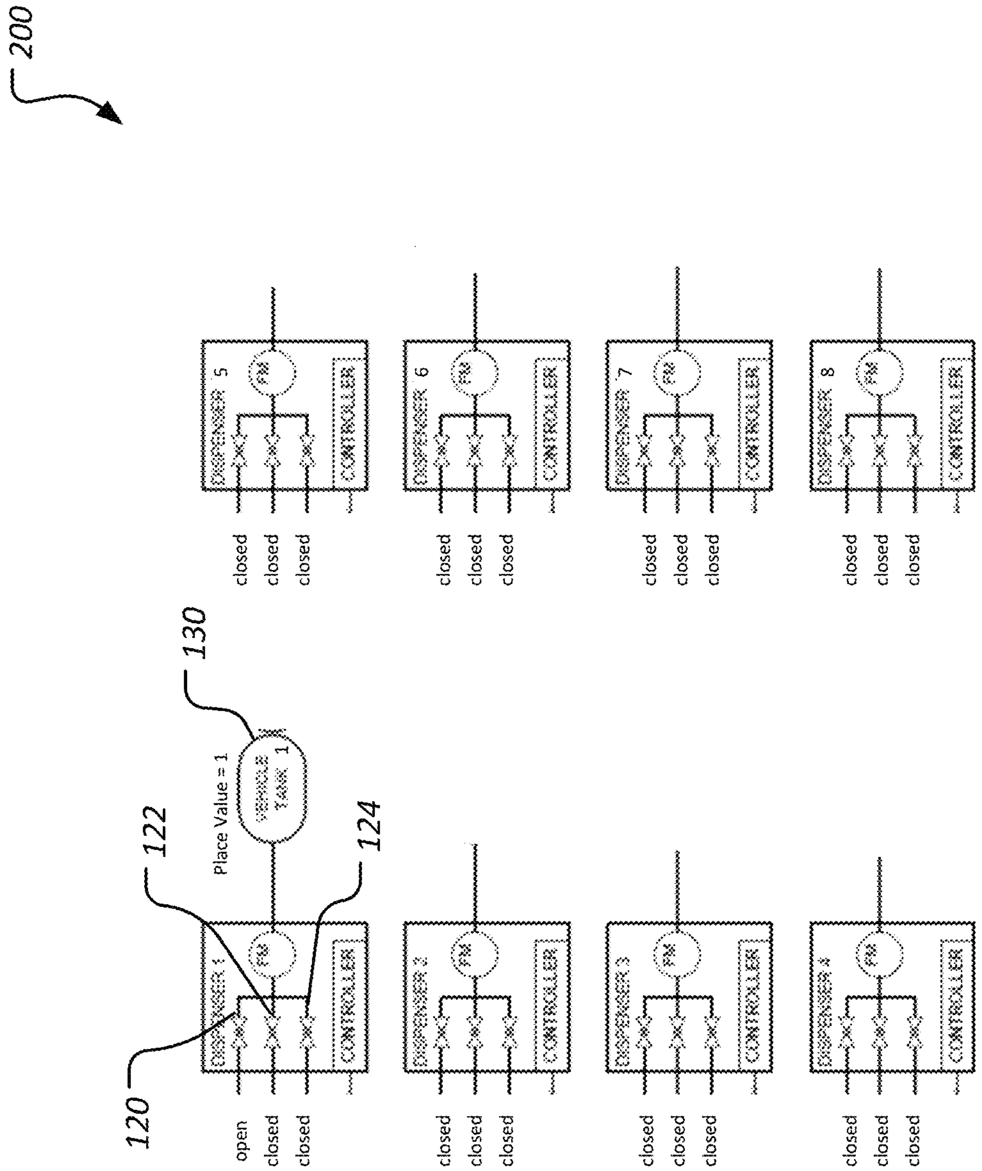

The display of site controller 128 of FIG. 3A and the physical layout of FIG. 3B show show that a #1 vehicle tank has been acknowledged by the site controller as arriving first and is therefore assigned an integer place value of 1 and flow of CNG is allowed. The integer place value of 1 is associated with providing the #1 vehicle tank with access to CNG from any of a High pressure storage tank, a Mid pressure storage tank, and a Low pressure storage tank. In some cases, a vehicle tank will be filled from the lower pressure storage tanks first so long as a minimum desired flow rate is maintained or exceeded. In some cases, filling from lower pressure storage tanks at acceptable flow rates (rather than more quickly filling from a storage tank with higher pressure) can preserve a filling system's capability to "top off" or otherwise quickly fill a mostly full vehicle tank that may already have a high pressure.

Figure 4A:
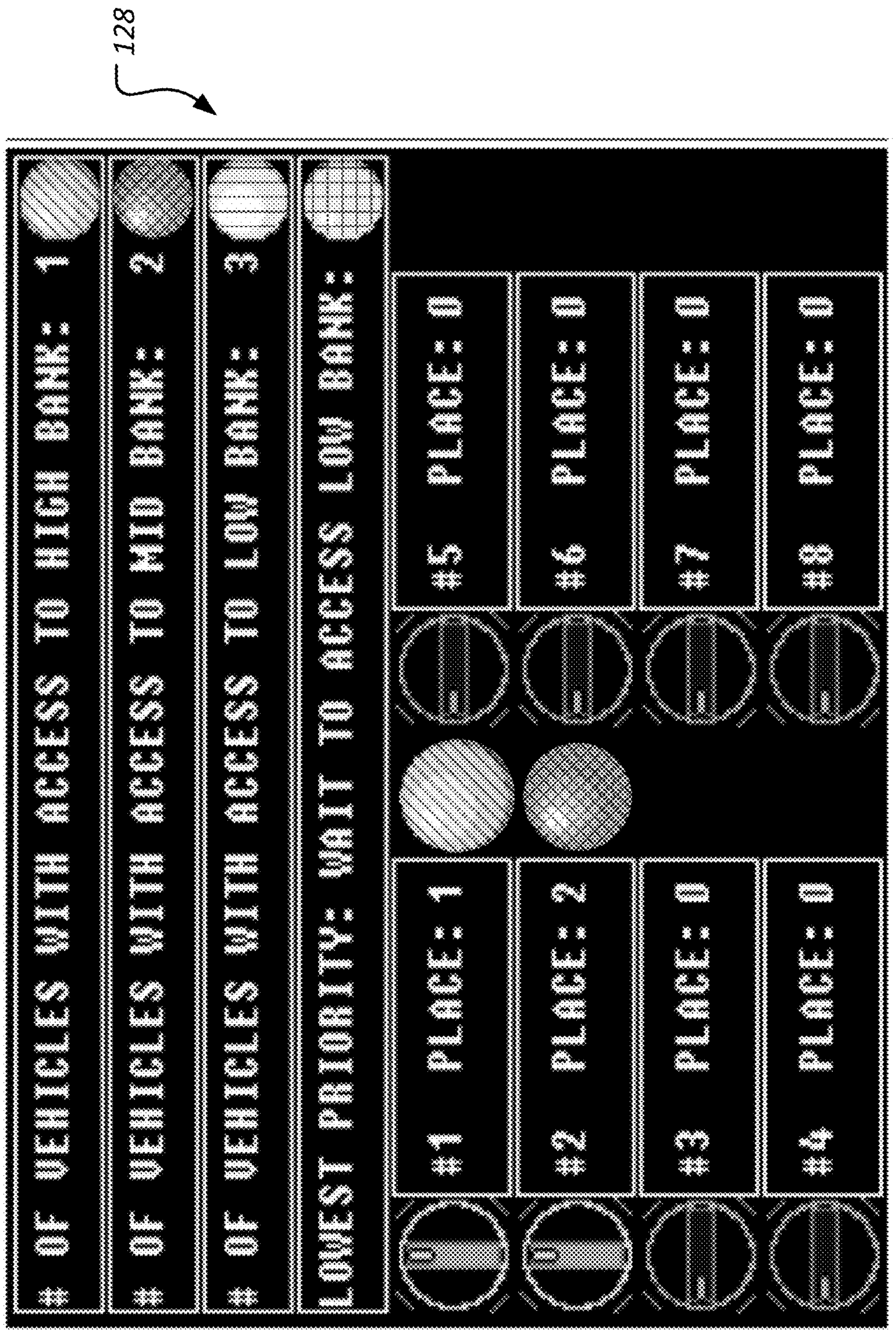
Figure 4B:
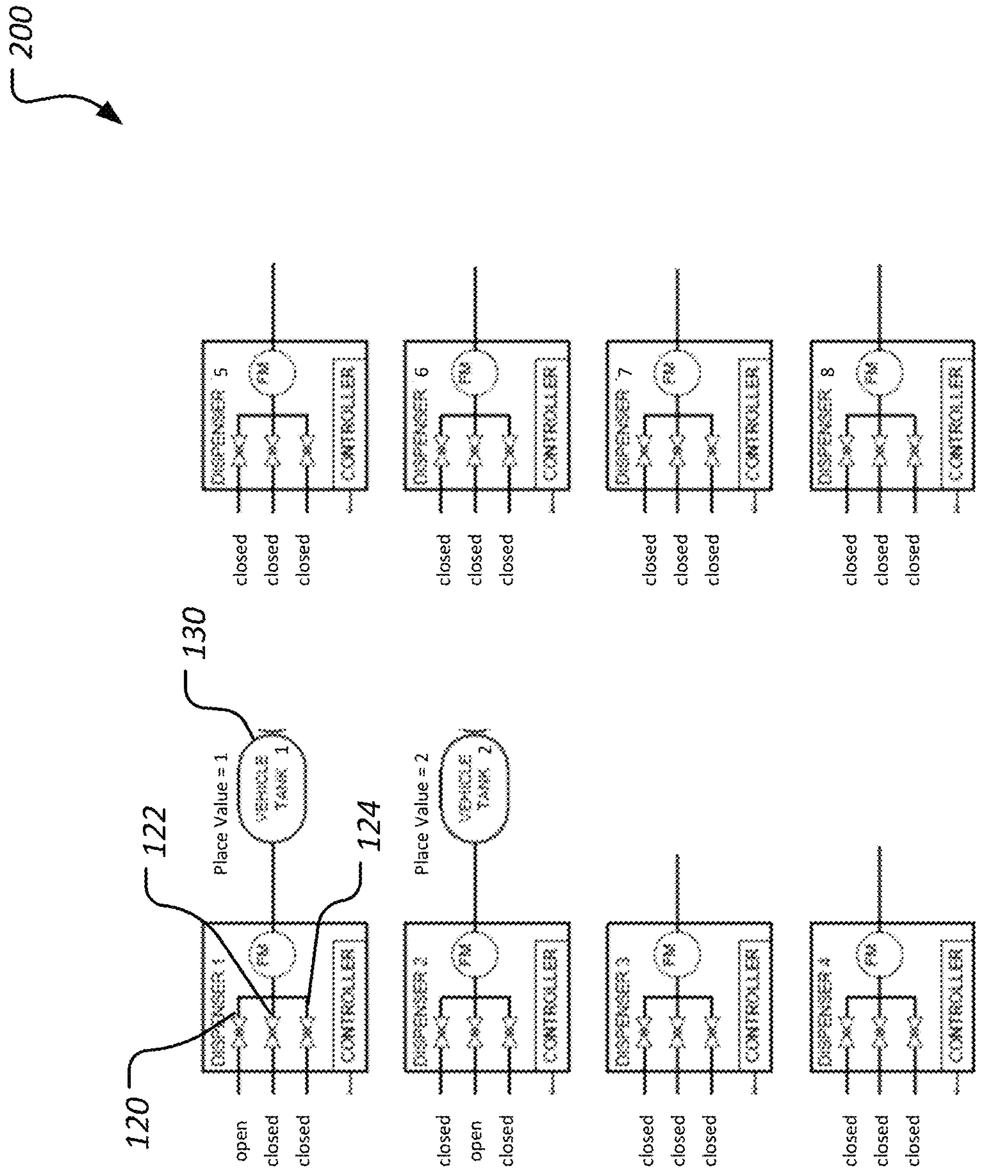

The display of site controller 128 of FIG. 4A and the physical layout of FIG. 4B show that a #2 vehicle tank has been acknowledged by the site controller as arriving after the #1 vehicle tank and is therefore assigned an integer place value of 2 and flow of CNG is allowed. The integer place value of 2 is associated with providing the #2 vehicle tank with access to CNG from either of a Mid pressure storage tank and a Low pressure storage tank. As shown in FIG. 4, #1 vehicle tank is filled from any of the High pressure storage tank, the Mid pressure storage tank, and the Low pressure storage tank while #2 vehicle tank is filled from either of the Mid pressure storage tank and the Low pressure storage tank.

Figure 5A:
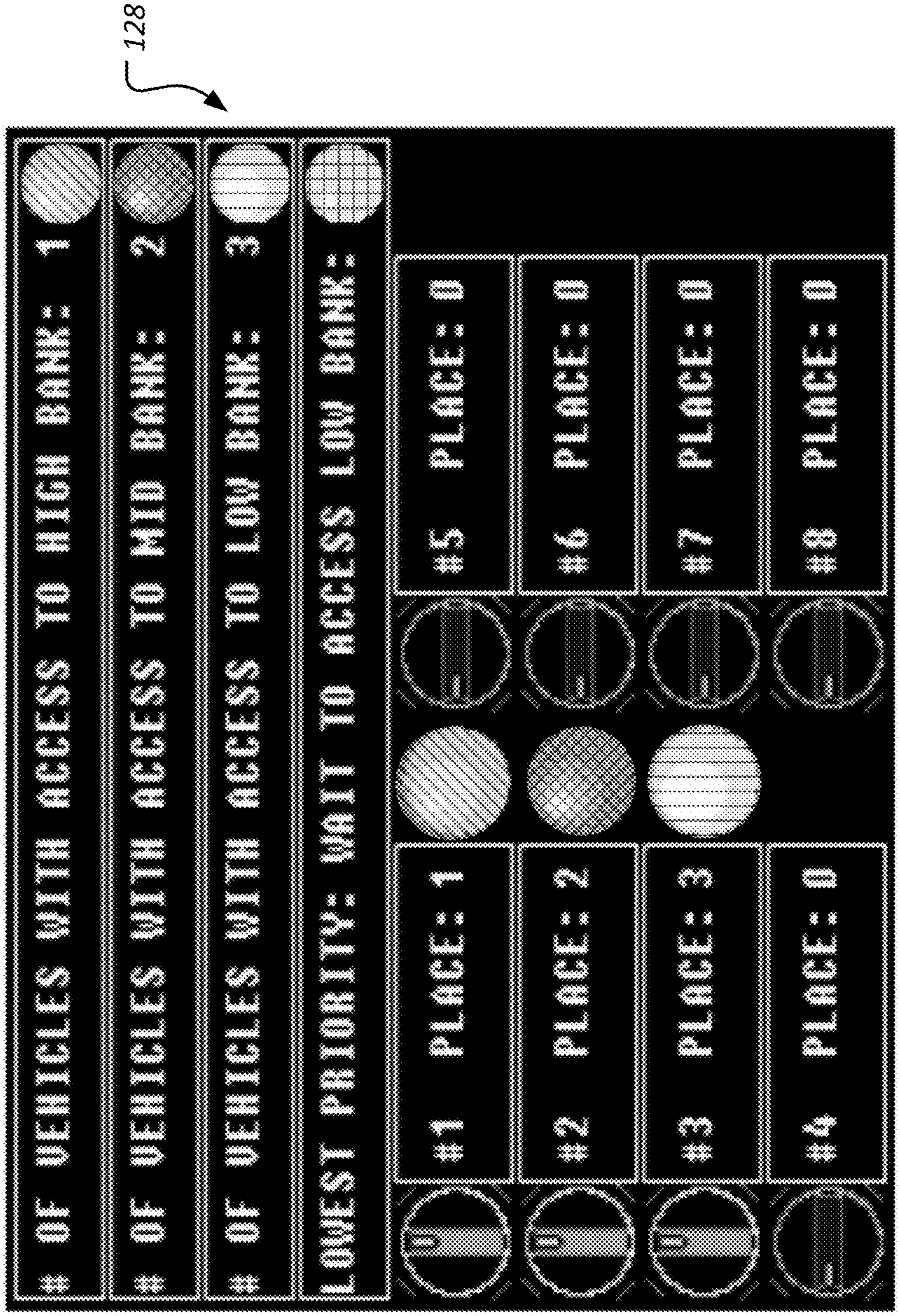
Figure 5B:
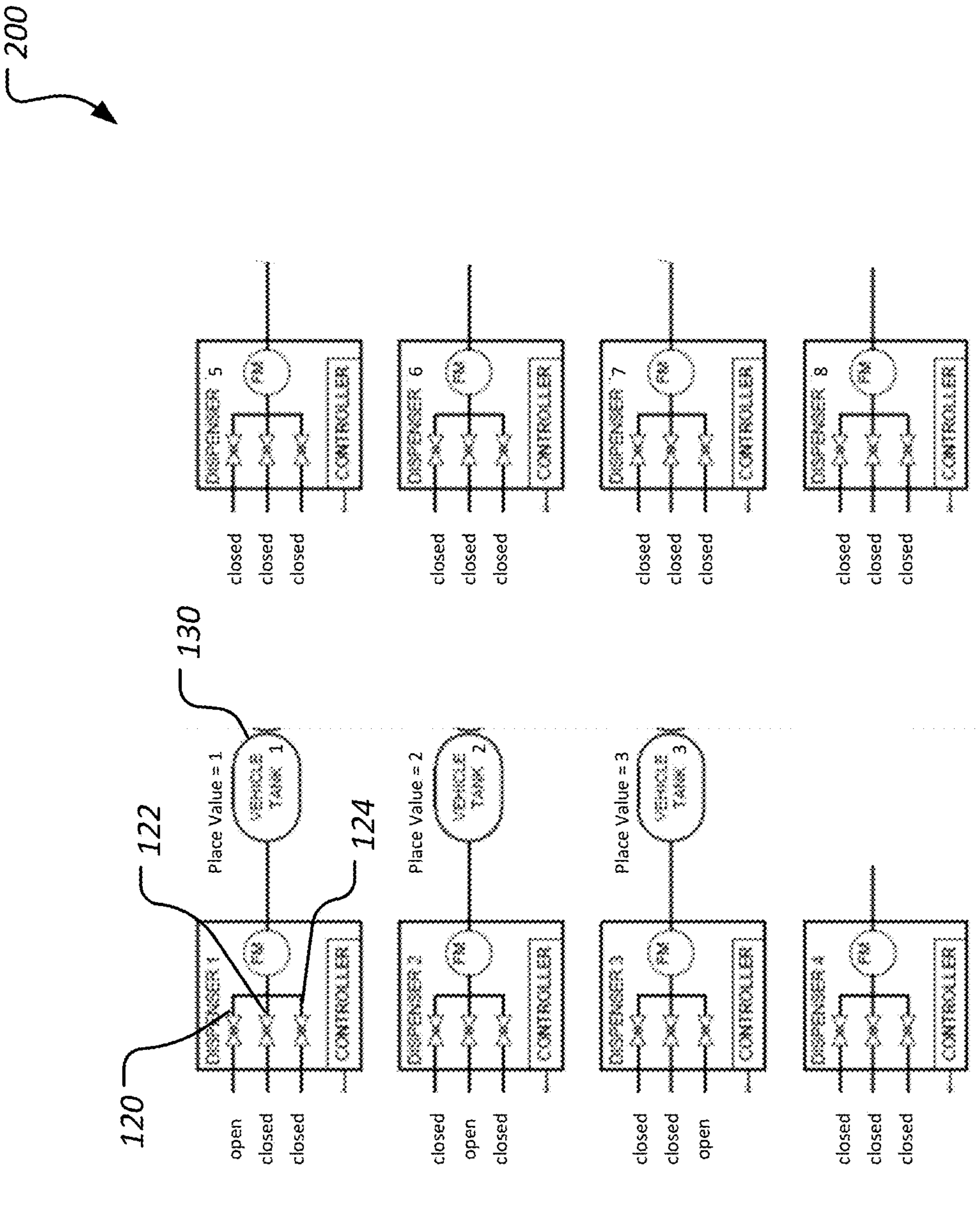
Figure 6A:
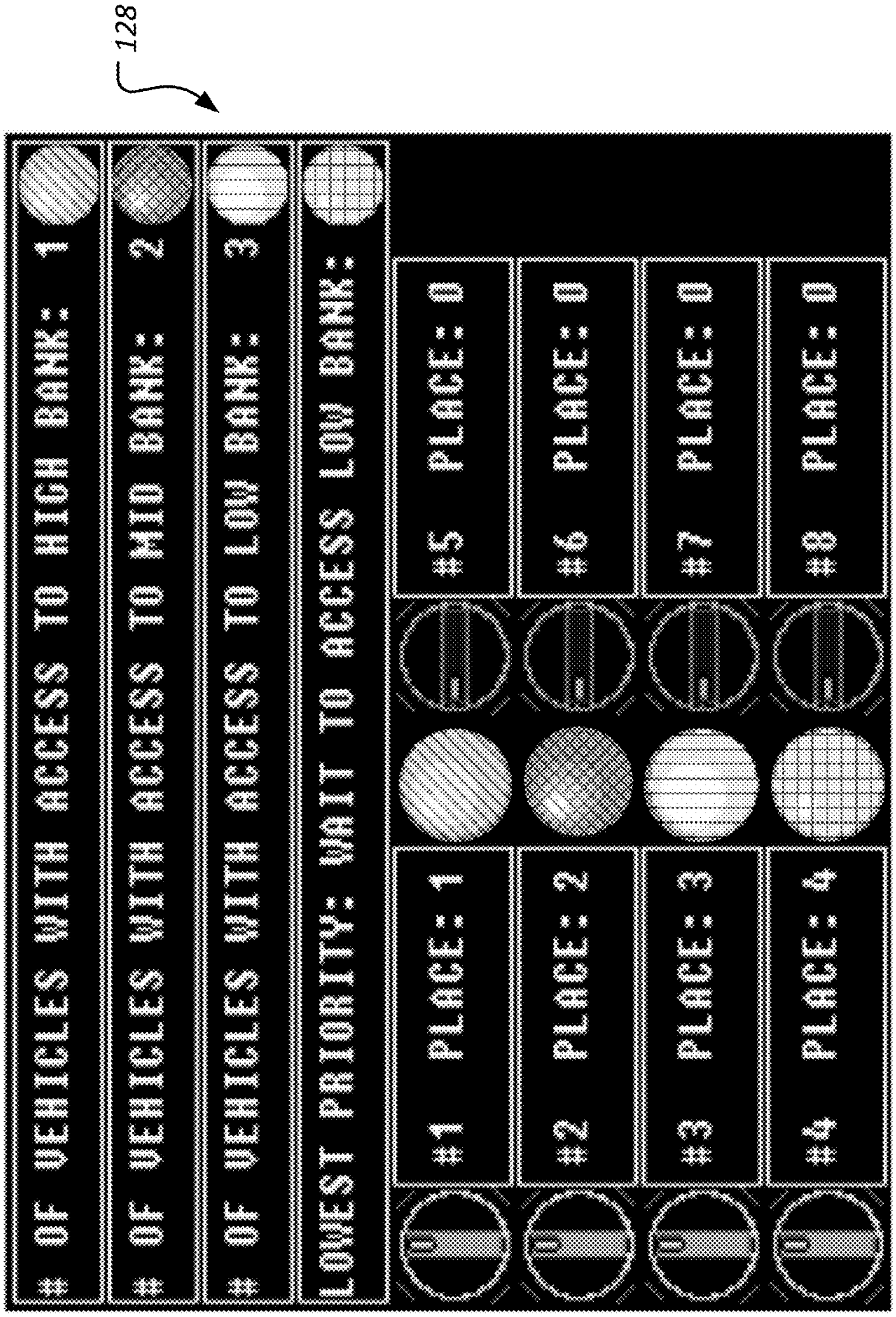
Figure 6B:
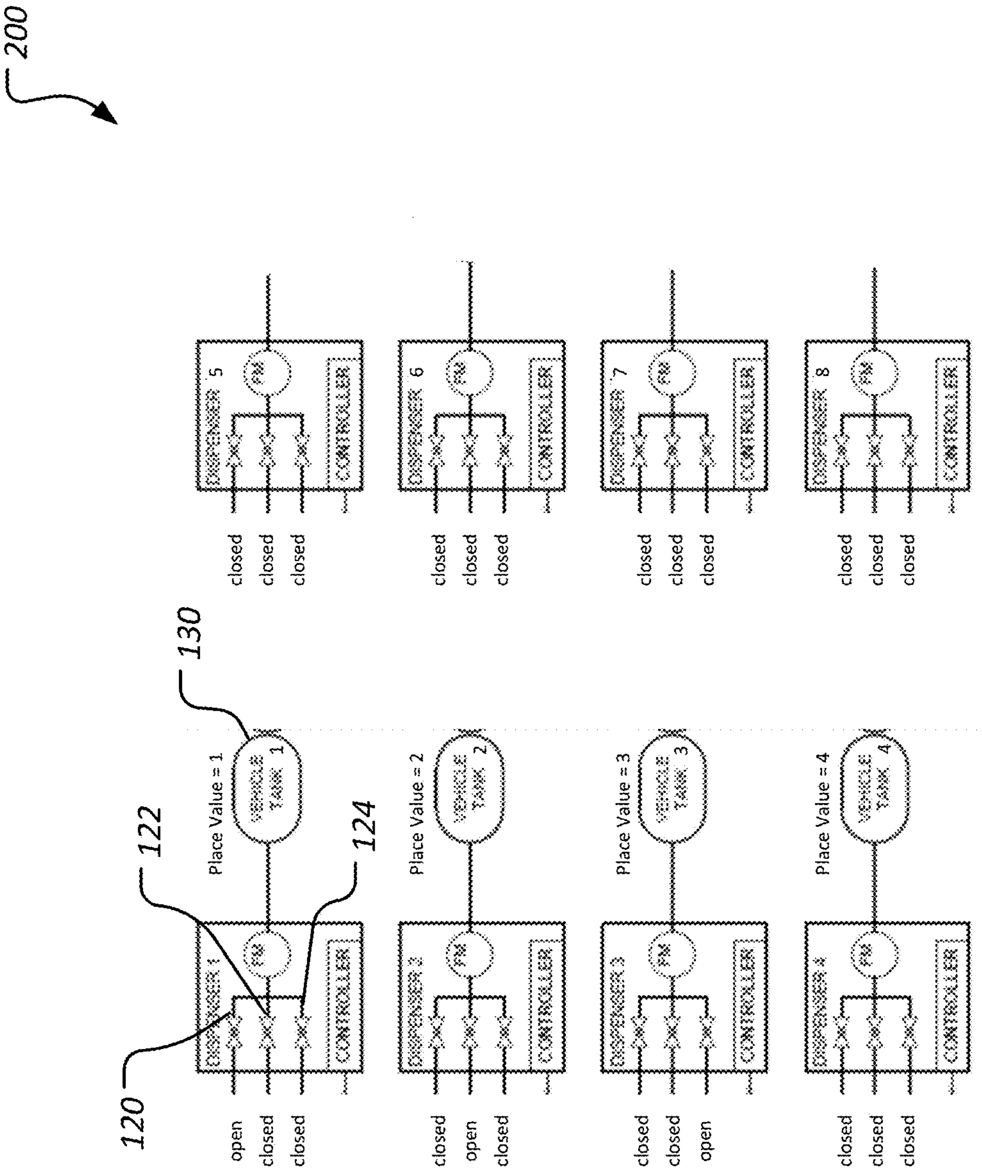
Figure 7A:
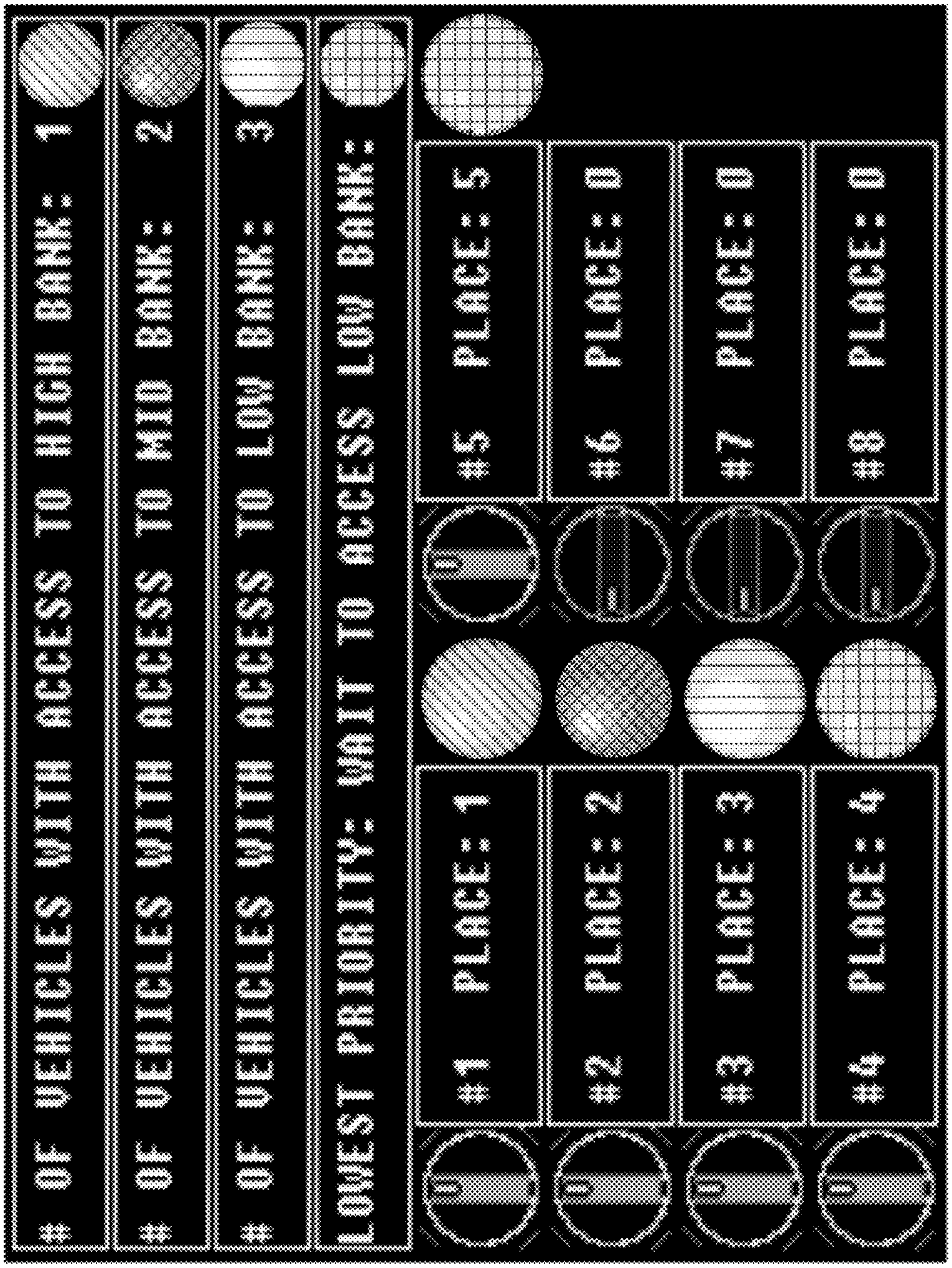
Figure 7B:
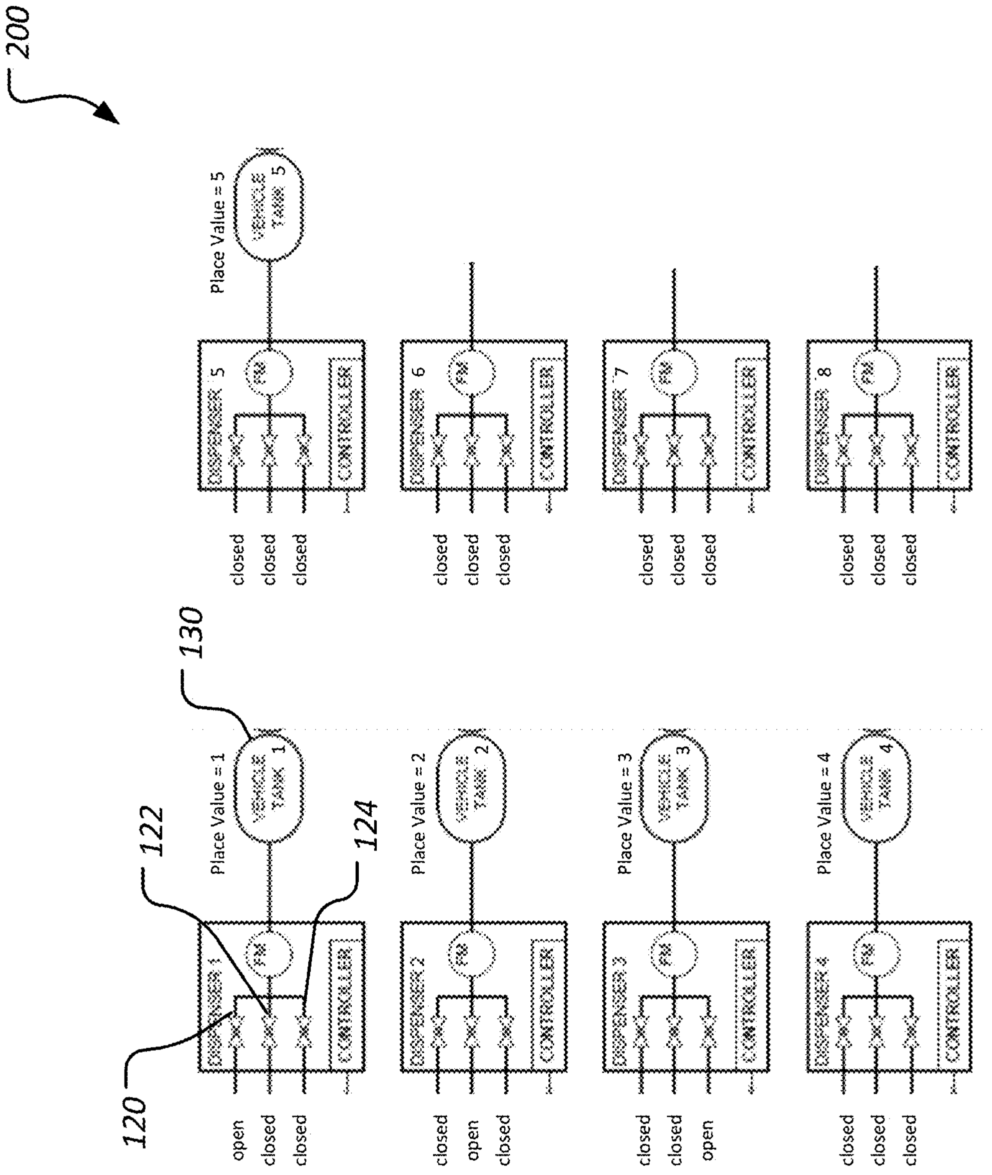
Figure 8A:
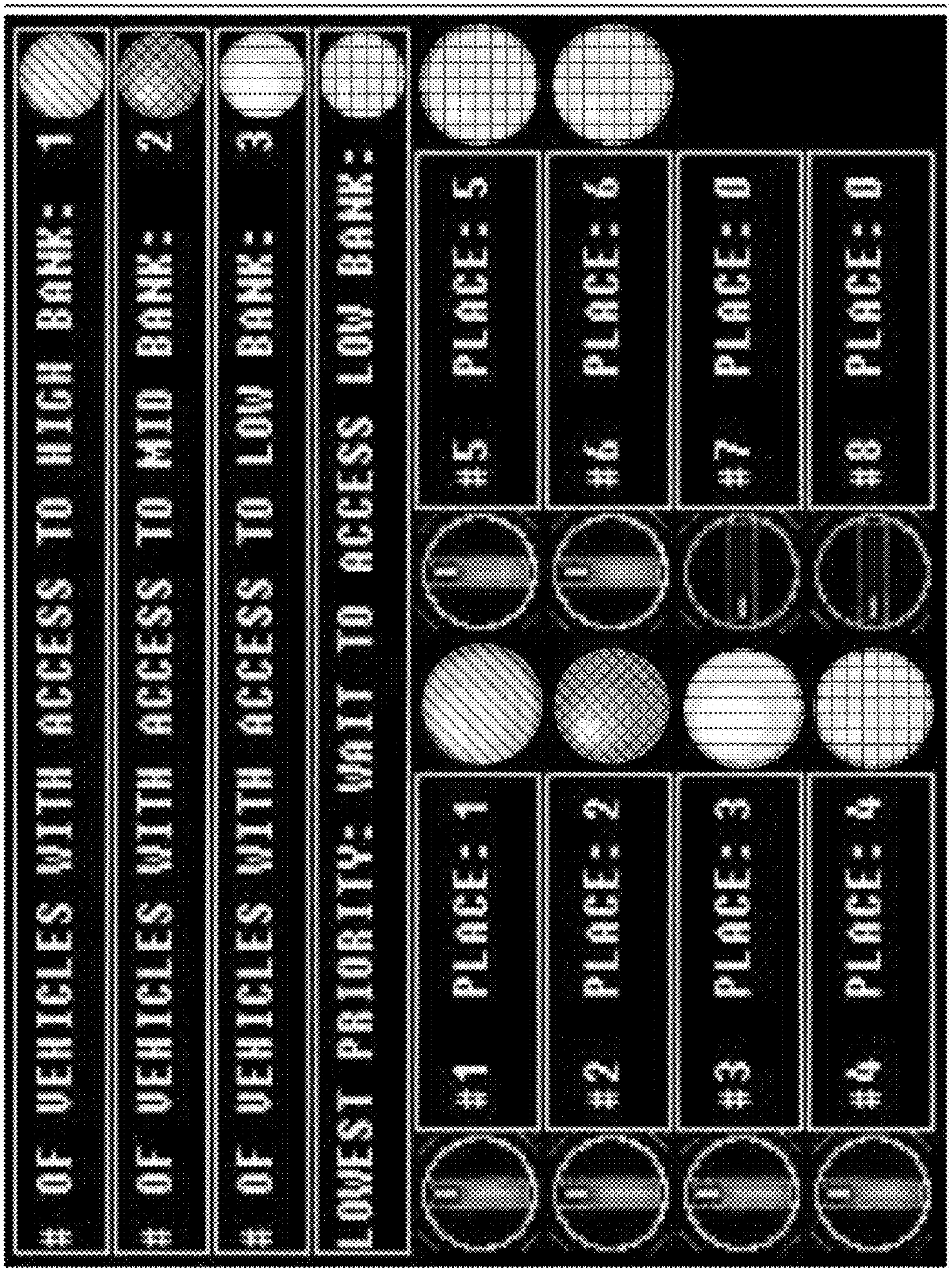
Figure 8B:
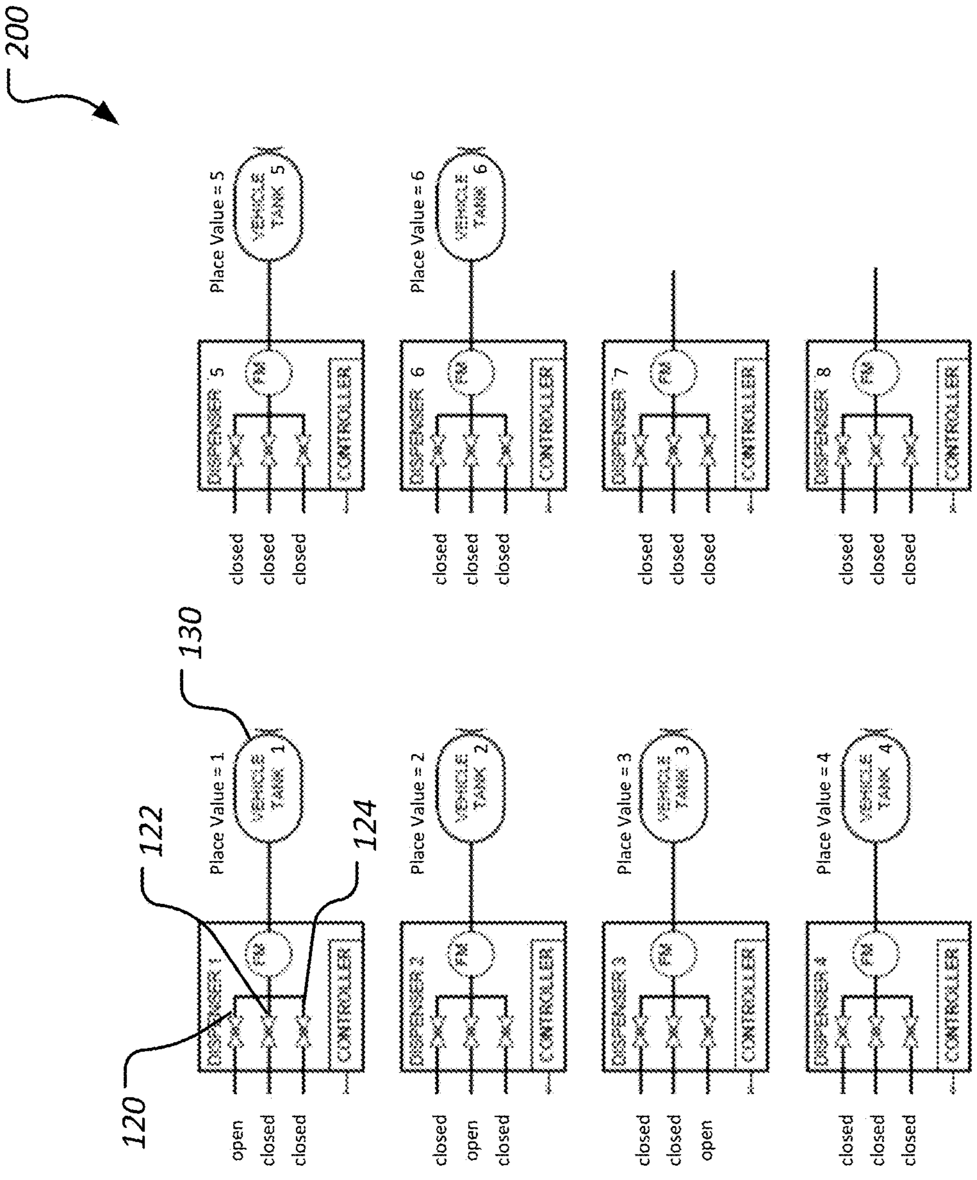
Figure 9A:
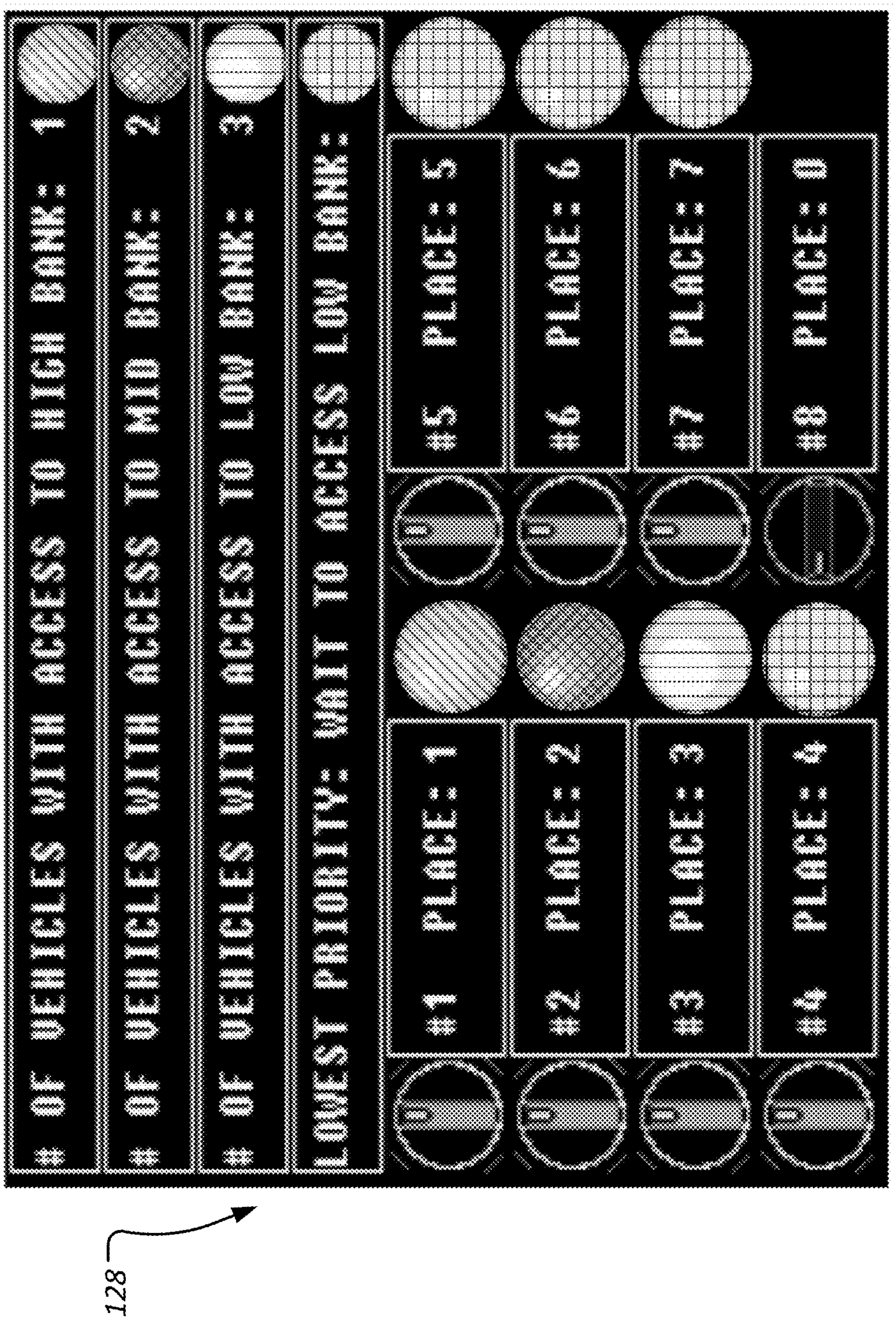
Figure 9B:
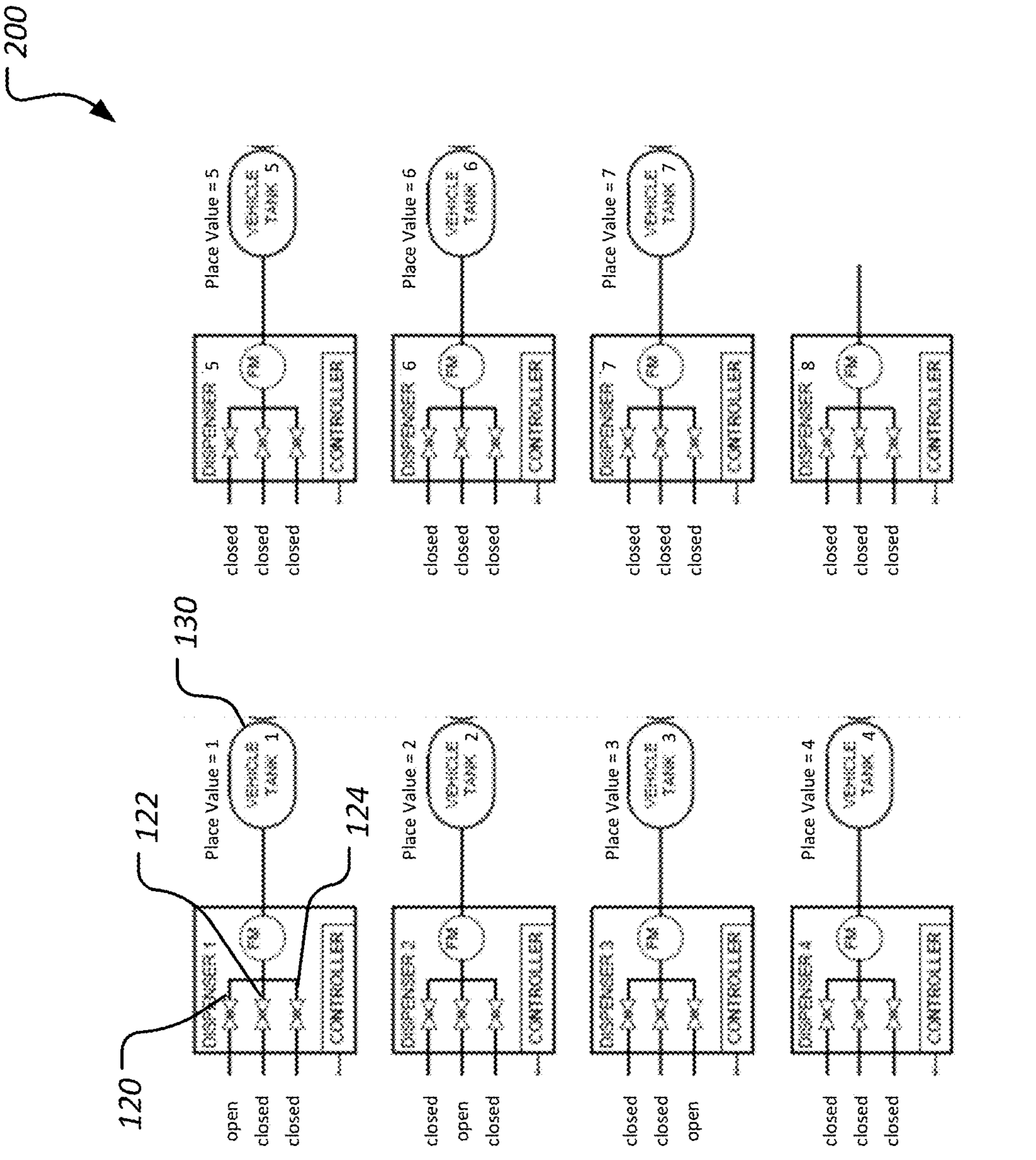

The display of site controller 128 of FIG. 5A and the physical layout of FIG. 5B show that a #3 vehicle tank has been acknowledged by the site controller as arriving after the #2 vehicle tank and is therefore assigned an integer place value of 3 and flow of CNG is allowed. The integer place value of 3 is associated with providing the #3 vehicle tank with access to CNG from a Low pressure storage tank. As shown in FIG. 5, #1 vehicle tank is filled from any of the High pressure storage, Mid pressure storage tank, and Low pressure storage tank, while #2 vehicle tank is filled from either of the Mid pressure storage tank and the Low pressure storage tank, and while #3 vehicle tank is filled from a Low pressure storage tank.

Figure 10A:
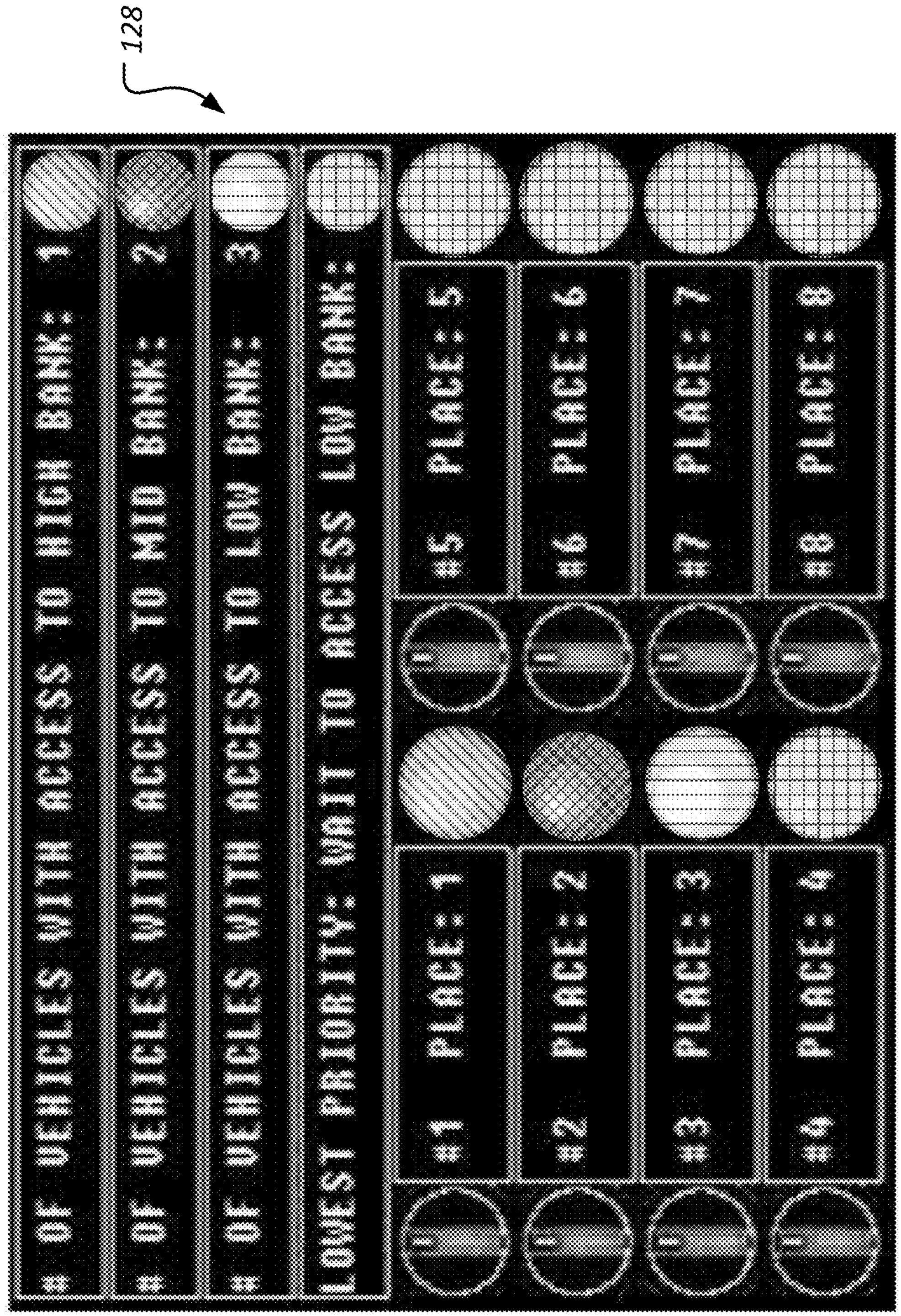
Figure 10B:
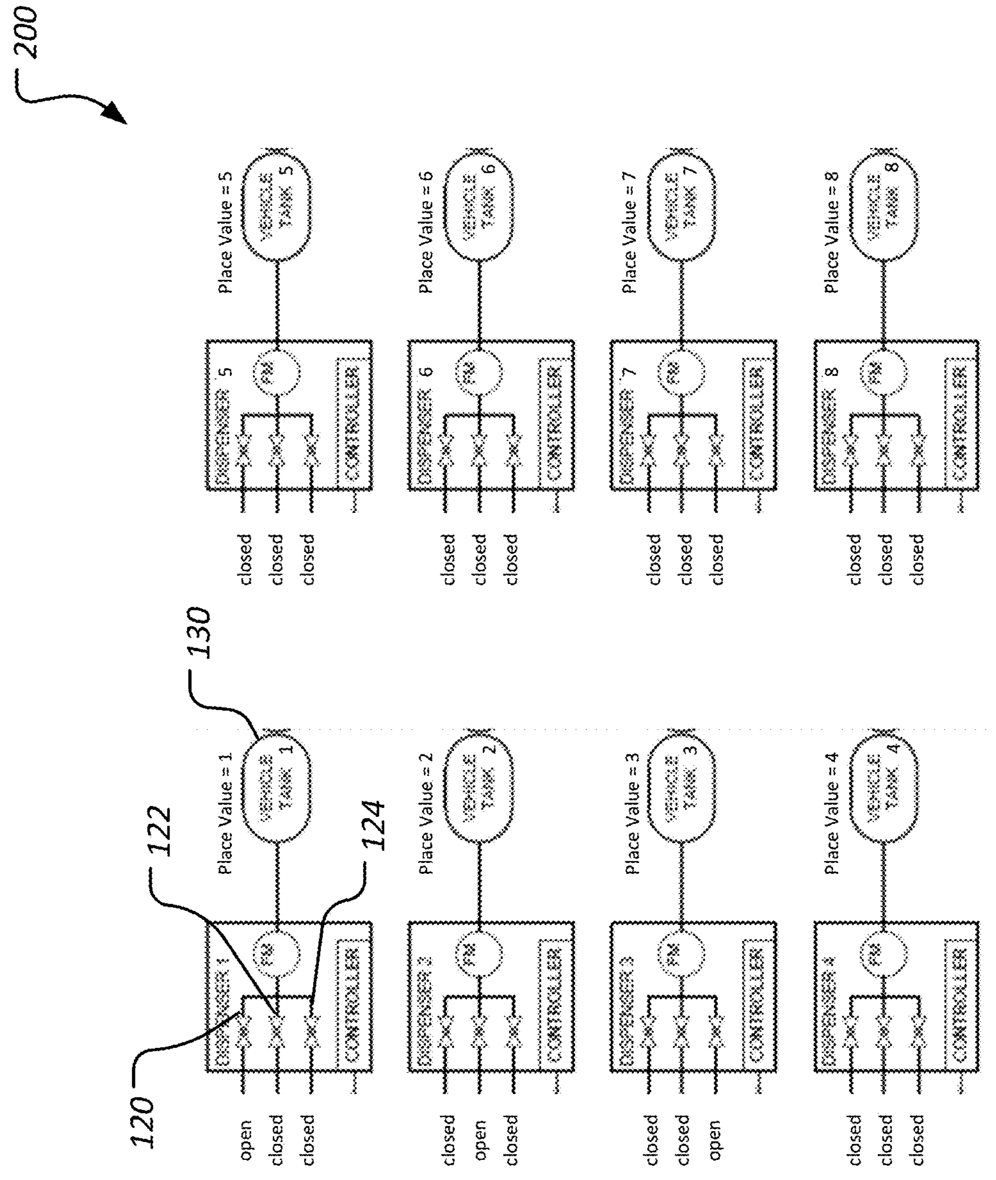

The displays of site controller 128 of FIGS. 6A, 7A, 8A, 9A, and 10A and the respective physical layouts of FIGS. 6B, 7B, 8B, 9B, and 10B show that a #4 vehicle tank has been acknowledged by the site controller and assigned an integer place value of 4, a #5 vehicle tank has been acknowledged by the site controller and assigned an integer place value of 5, a #6 vehicle tank has been acknowledged by the site controller and assigned an integer place value of 6, a #7 vehicle tank has been acknowledged by the site controller and assigned an integer place value of 7, and a #8 vehicle tank has been acknowledged by the site controller and assigned an integer place value of 8, respectively. In the embodiment represented by FIGS. 2A-18B, integer place values of 4 and greater are associated with the vehicle tanks not being given access to any storage tanks. Instead, as shown in FIGS. 10A and 10B, each of #4-#8 vehicle tanks are waiting in order for access to the Low pressure storage tank.

Figure 11A:
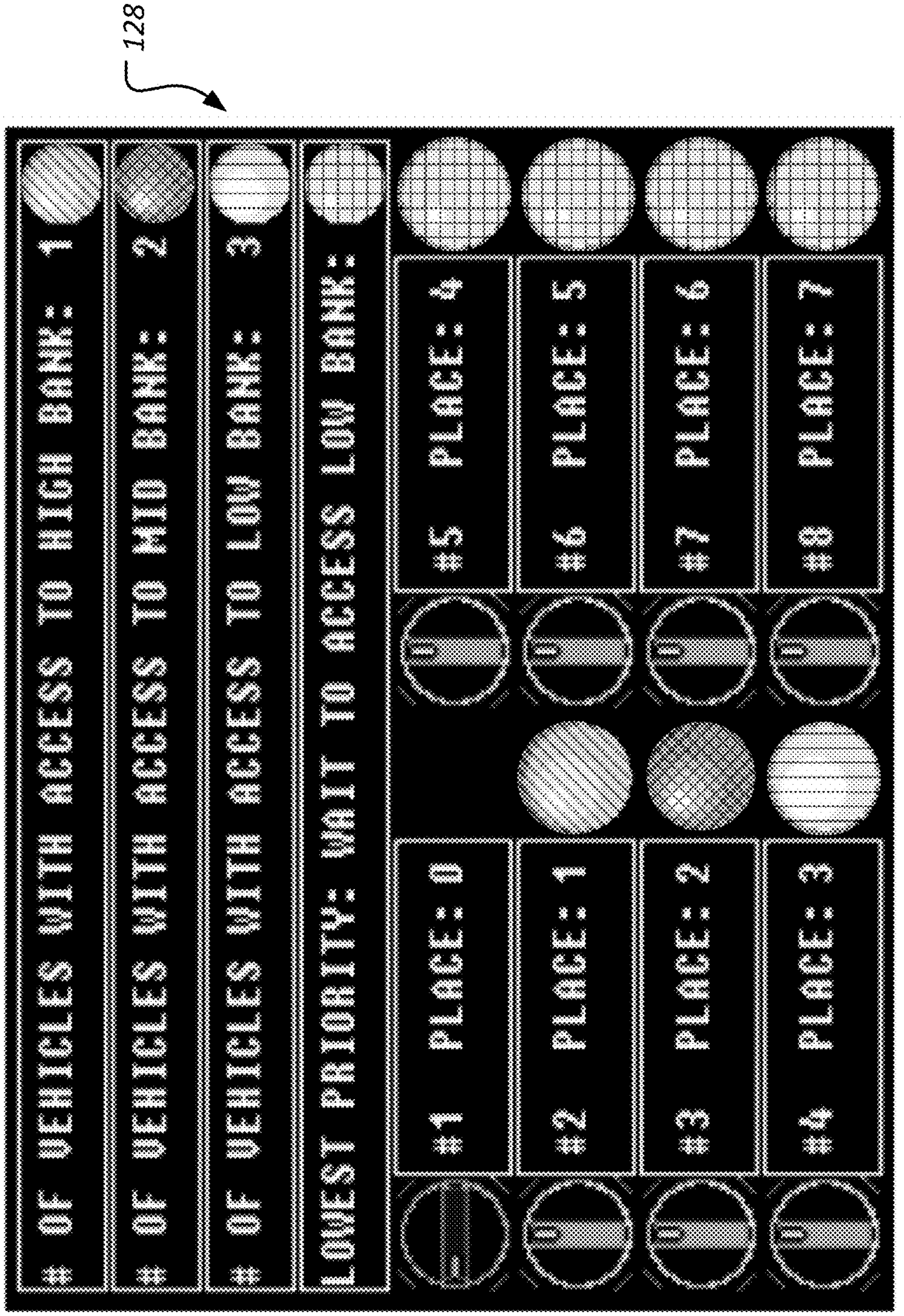
Figure 11B:
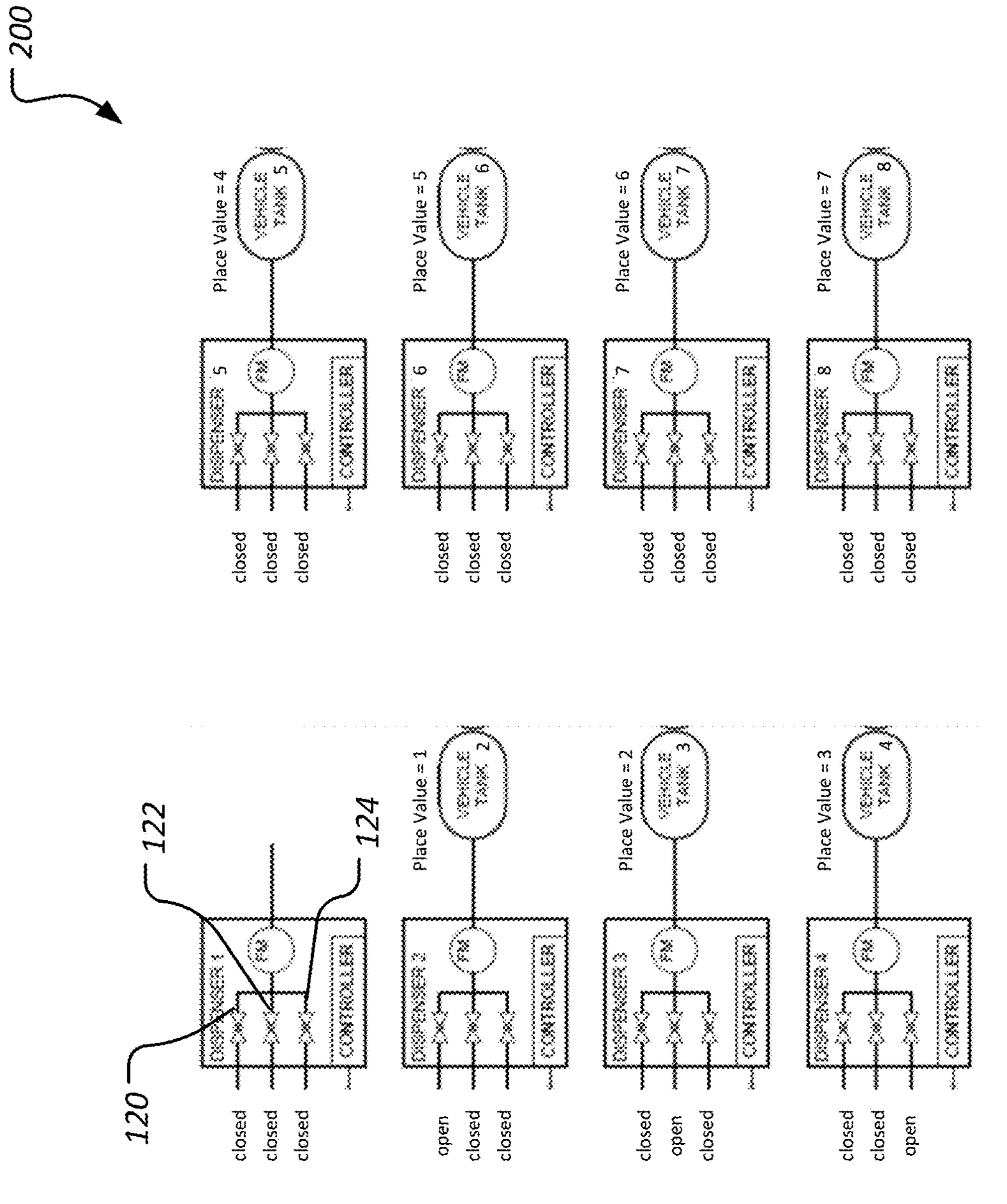

The display of site controller 128 of FIG. 11A and the physical layout of FIG. 11B show that the #1 vehicle tank has been filled with CNG or otherwise discontinued from the CNG filling process. In response, the site controller revises the integer place value of each of #2-#8 vehicle tanks by reducing the integer place values by subtracting 1. Accordingly, #2 vehicle tank is now assigned an integer place value of 1, #3 vehicle tank is now assigned an integer place value of 2, and #4 vehicle tank is now assigned an integer place value of 3. As such, #2 vehicle tank is filled from any of the High storage tank, the Mid storage tank, and the Low storage tank, #3 vehicle tank is filled from either of the Mid storage tank and the Low storage tank, and #4 vehicle tank is filled from the Low storage tank while #5-#8 vehicle tanks still have integer values of 4 and greater (so they get no CNG filling from any storage tank).

Figure 12A:
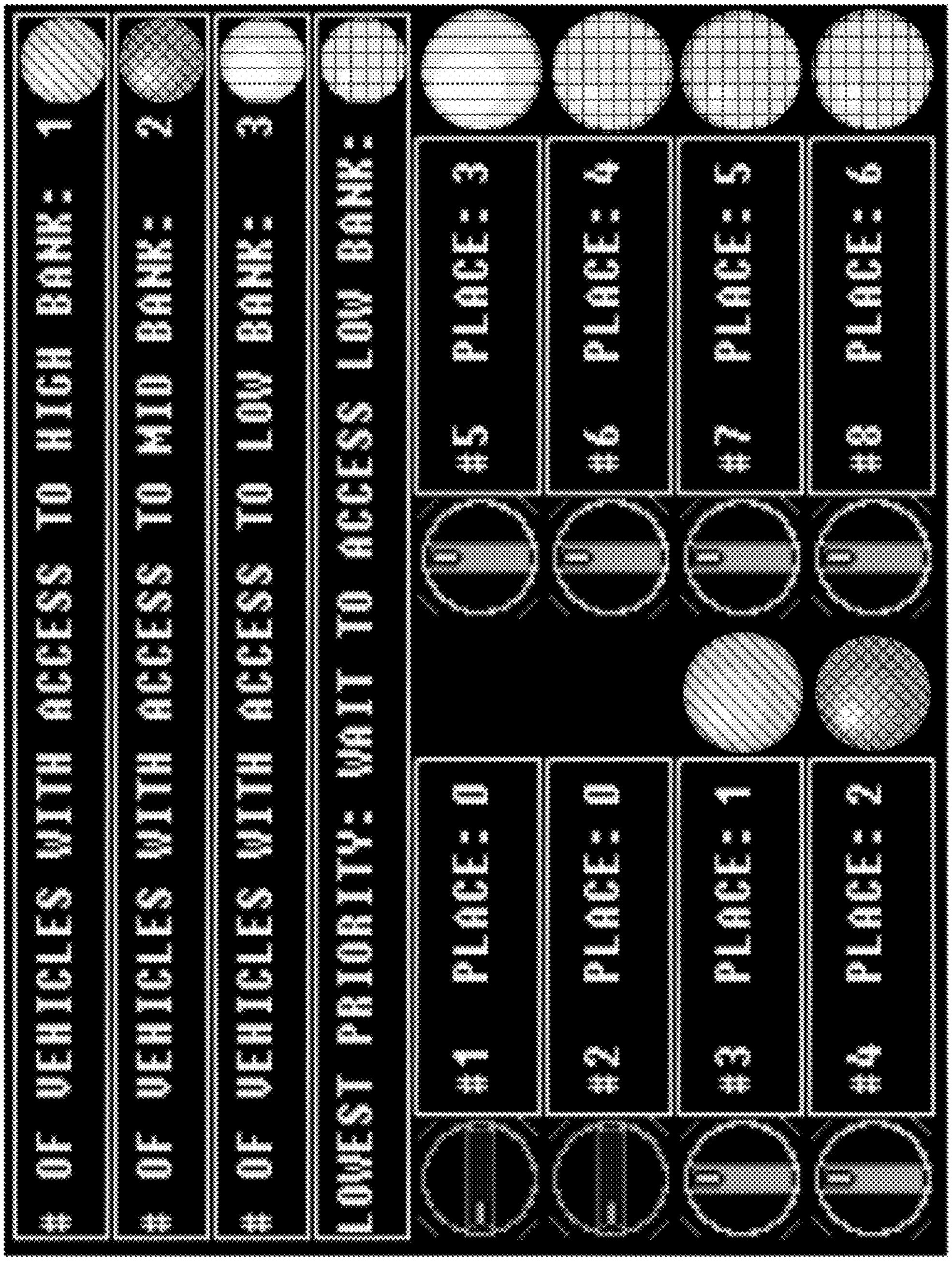
Figure 12B:
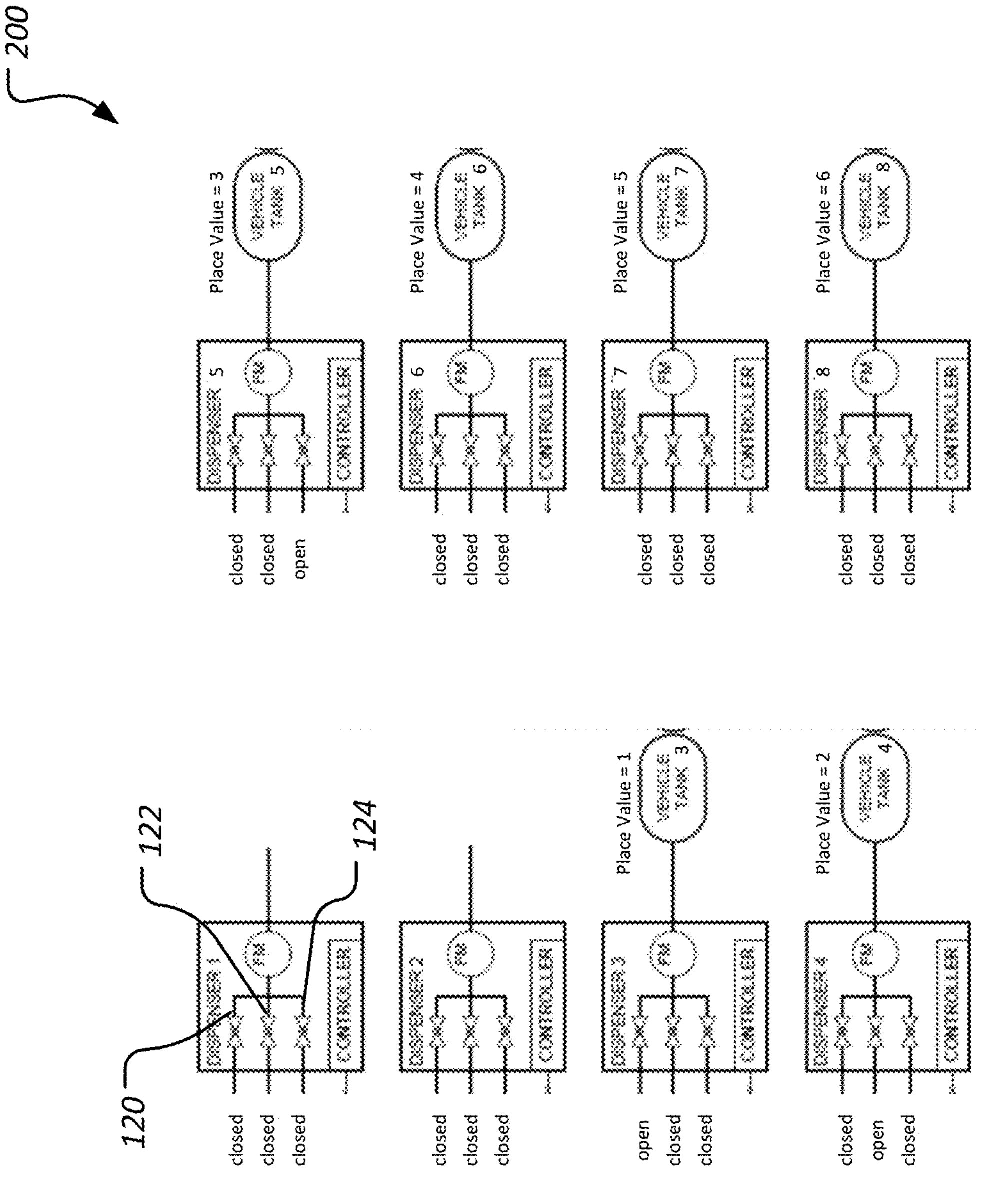

The display of site controller 128 of FIG. 12A and the physical layout of FIG. 12B show that the #2 vehicle tank has been filled with CNG or otherwise discontinued from the CNG filling process. In response, the site controller revises the integer place value of each of #3-#8 vehicle tanks by reducing the integer place values by subtracting 1. Accordingly, #3 vehicle tank is now assigned an integer place value of 1, #4 vehicle tank is now assigned an integer place value of 2, and #5 vehicle tank is now assigned an integer place value of 3. As such, #3 vehicle tank is filled from any of the High storage tank, the Mid storage tank, and the Low storage tank, #4 vehicle tank is filled from the either of the Mid storage tank and the Low storage tank, and #5 vehicle tank is filled from the Low storage tank while #6-#8 vehicle tanks still have integer values of 4 and greater (so they get no CNG filling from any storage tank).

Figure 13A:
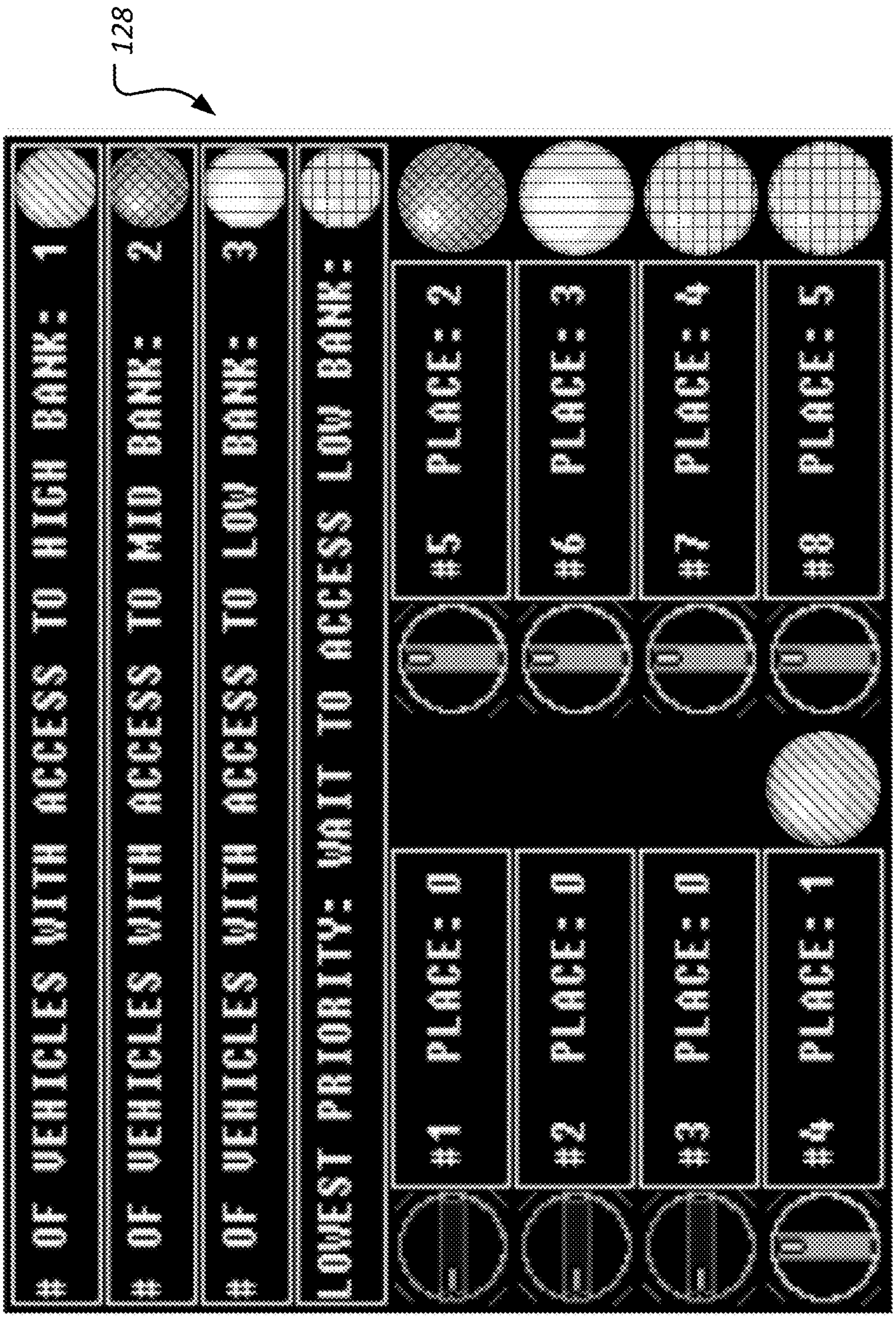
Figure 13B:
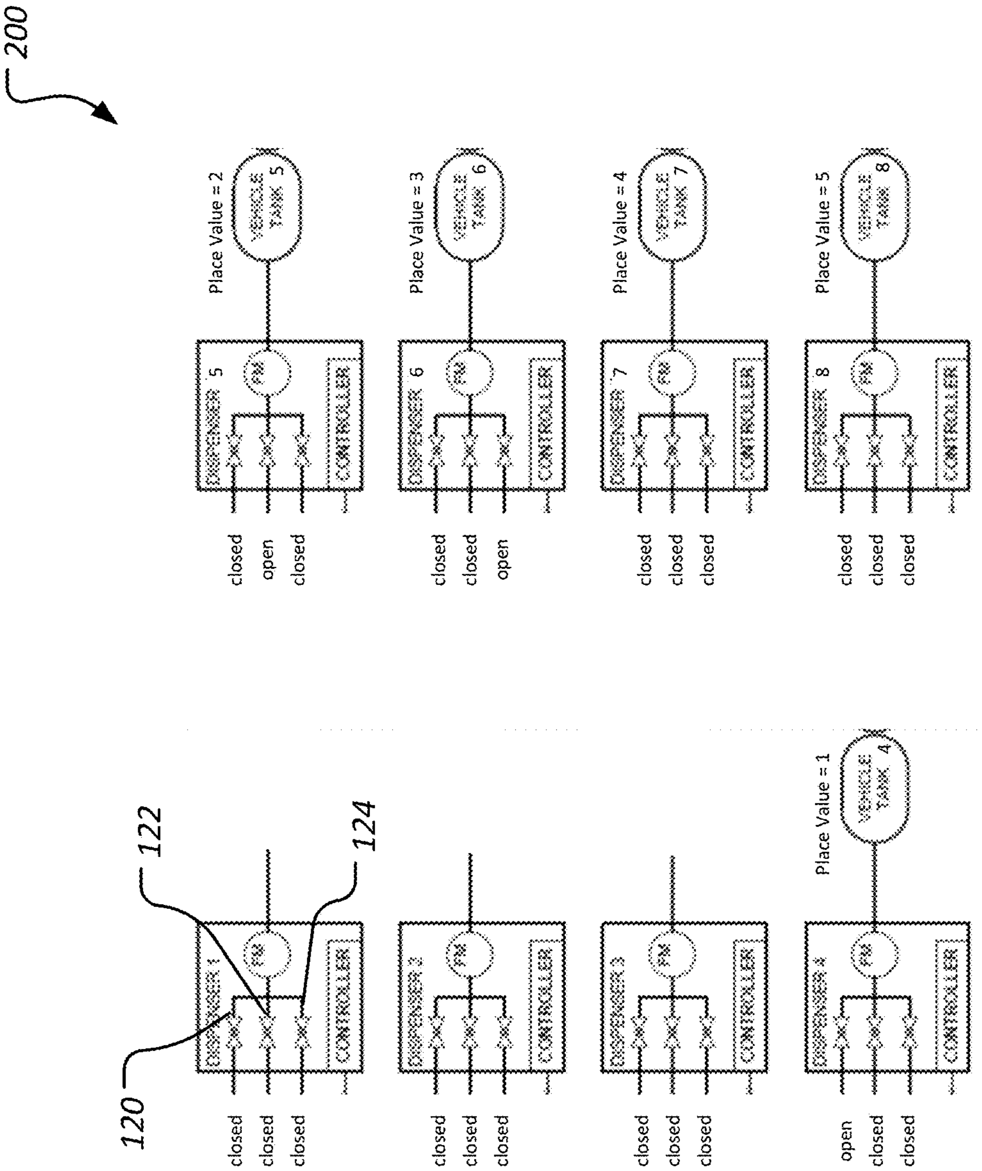

The display of site controller 128 of FIG. 13A and the physical layout of FIG. 13B show that the #3 vehicle tank has been filled with CNG or otherwise discontinued from the CNG filling process. In response, the site controller revises the integer place value of each of #4-#8 vehicle tanks by reducing the integer place values by subtracting 1. Accordingly, #4 vehicle tank is now assigned an integer place value of 1, #5 vehicle tank is now assigned an integer place value of 2, and #6 vehicle tank is now assigned an integer place value of 3. As such, #4 vehicle tank is filled from any of the High storage tank, the Mid storage tank, and the Low storage tank, #5 vehicle tank is filled from either of the Mid storage tank and the Low storage tank, and #6 vehicle tank is filled from the Low storage tank while #7-#8 vehicle tanks still have integer values of 4 and greater (so they get no CNG filling from any storage tank).

Figure 14A:
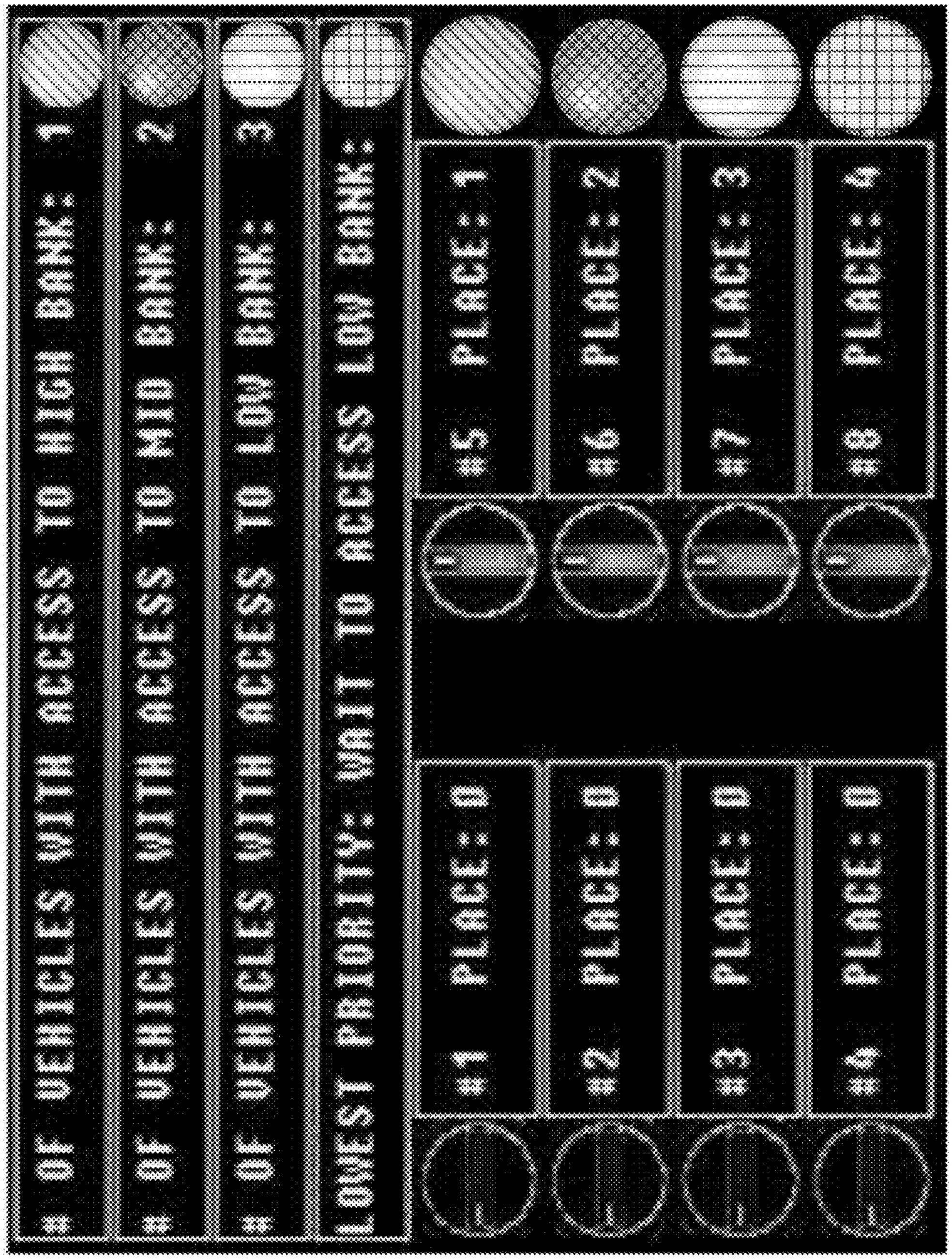
Figure 14B:
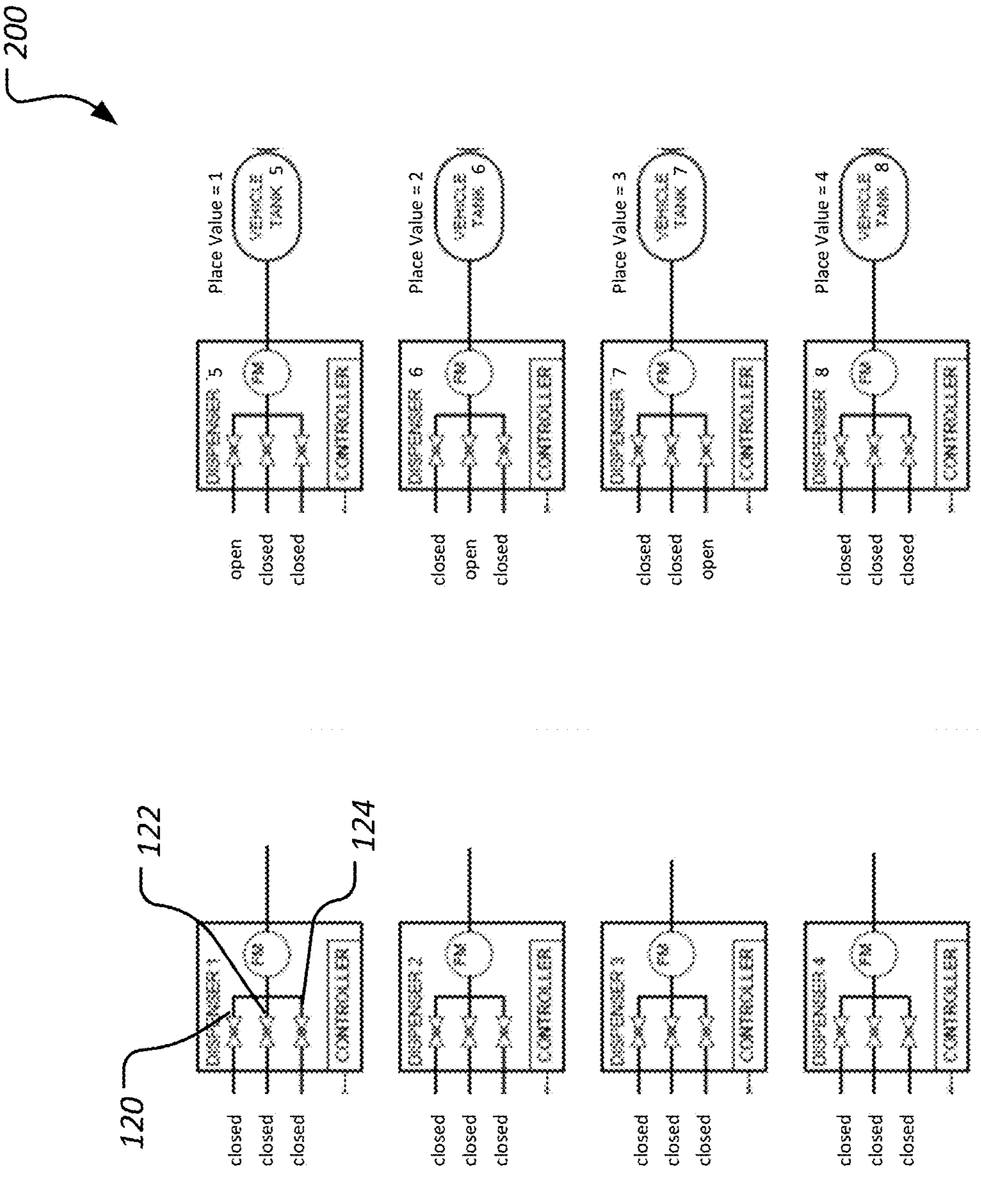

The display of site controller 128 of FIG. 14A and the physical layout of FIG. 14B show that the #4 vehicle tank has been filled with CNG or otherwise discontinued from the CNG filling process. In response, the site controller revises the integer place value of each of #5-#8 vehicle tanks by reducing the integer place values by subtracting 1. Accordingly, #5 vehicle tank is now assigned an integer place value of 1, #6 vehicle tank is now assigned an integer place value of 2, and #7 vehicle tank is now assigned an integer place value of 3. As such, #5 vehicle tank is filled from any of the High storage tank, the Mid storage tank, and the Low storage tank, #6 vehicle tank is filled from either of the Mid storage tank and the Low storage tank, and #7 vehicle tank is filled from the Low storage tank while the #8 vehicle tank still has an integer value of 4 (so it gets no CNG filling from any storage tank).

Figure 15A:
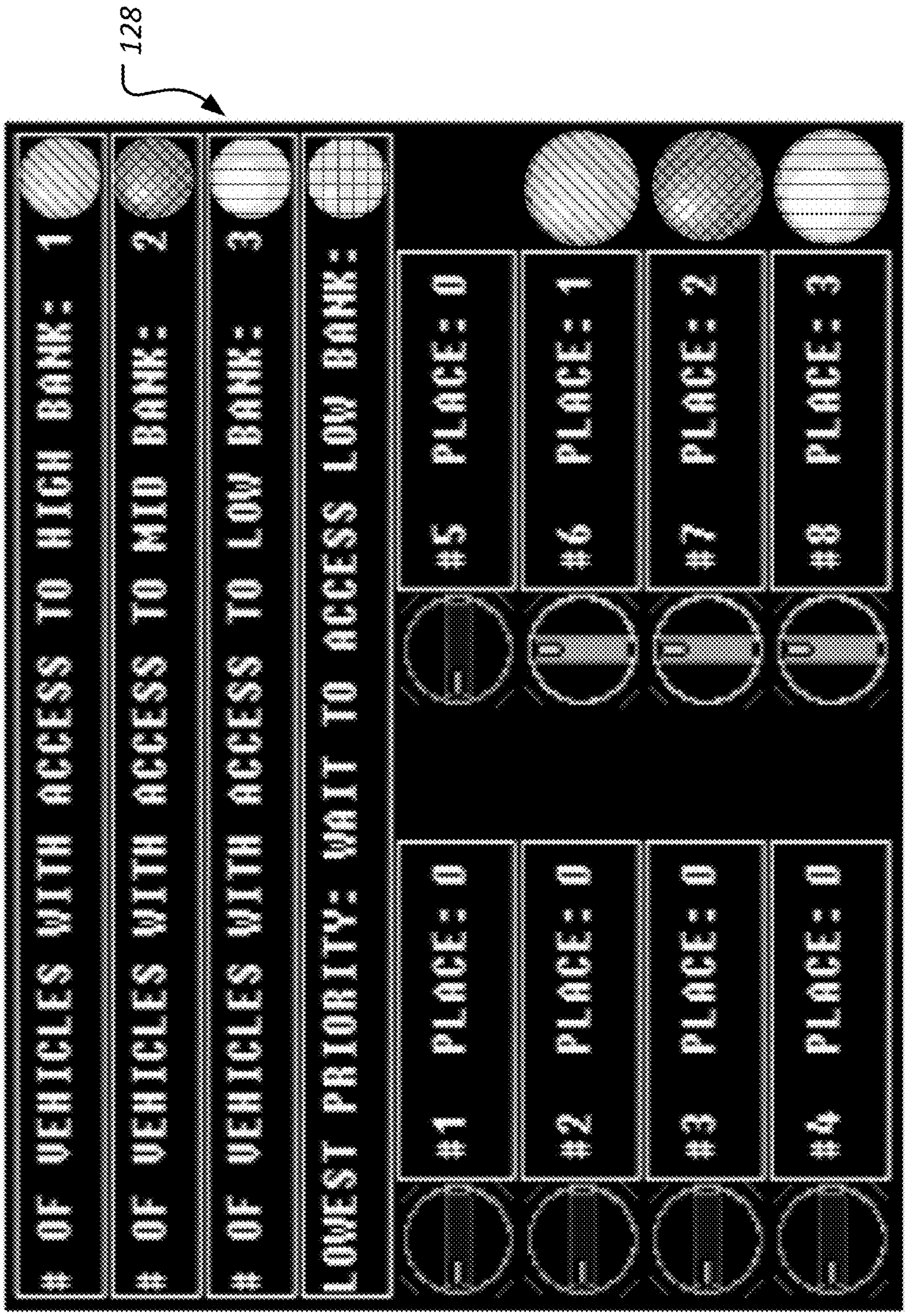
Figure 15B:
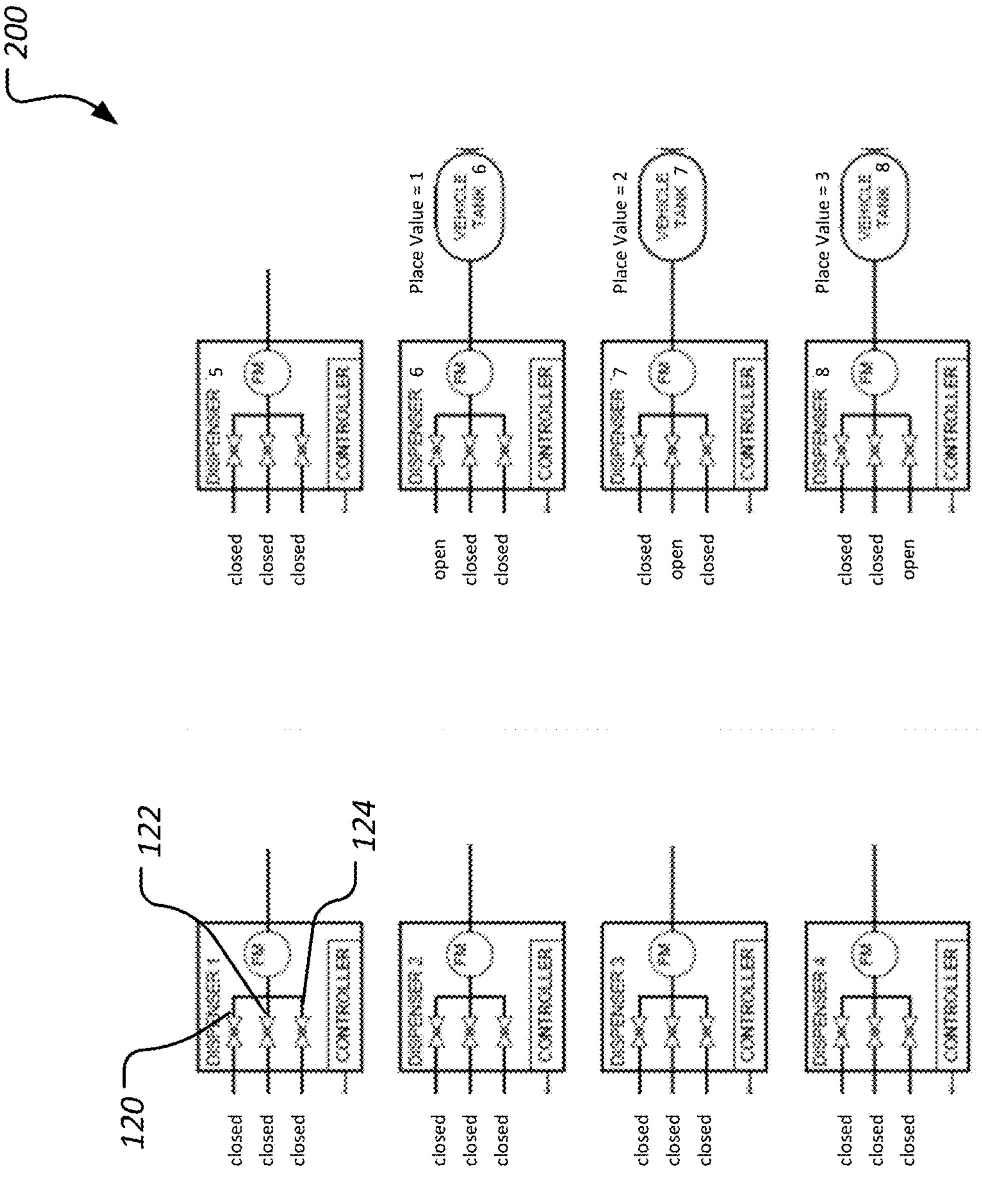

The display of site controller 128 of FIG. 15A and the physical layout of FIG. 15B show that the #5 vehicle tank has been filled with CNG or otherwise discontinued from the CNG filling process. In response, the site controller revises the integer place value of each of #6-#8 vehicle tanks by reducing the integer place values by subtracting 1. Accordingly, #6 vehicle tank is now assigned an integer place value of 1, #7 vehicle tank is now assigned an integer place value of 2, and #8 vehicle tank is now assigned an integer place value of 3. As such, #6 vehicle tank is filled from any of the High storage tank, the Mid storage tank, and the Low storage tank, #7 vehicle tank is filled from either of the Mid storage tank and the Low storage tank, and #8 vehicle tank is filled from the Low storage tank.

Figure 16A:
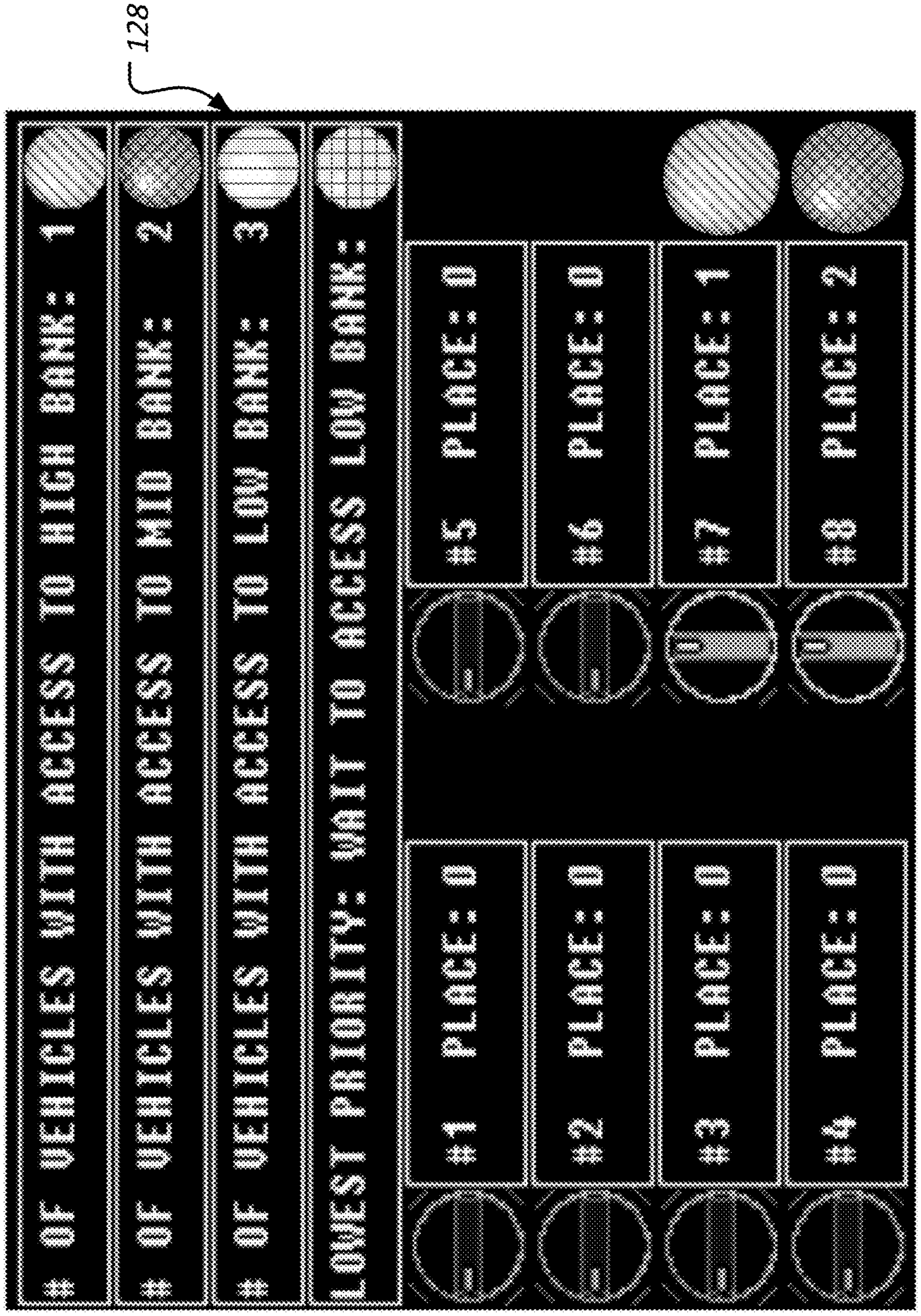
Figure 16B:
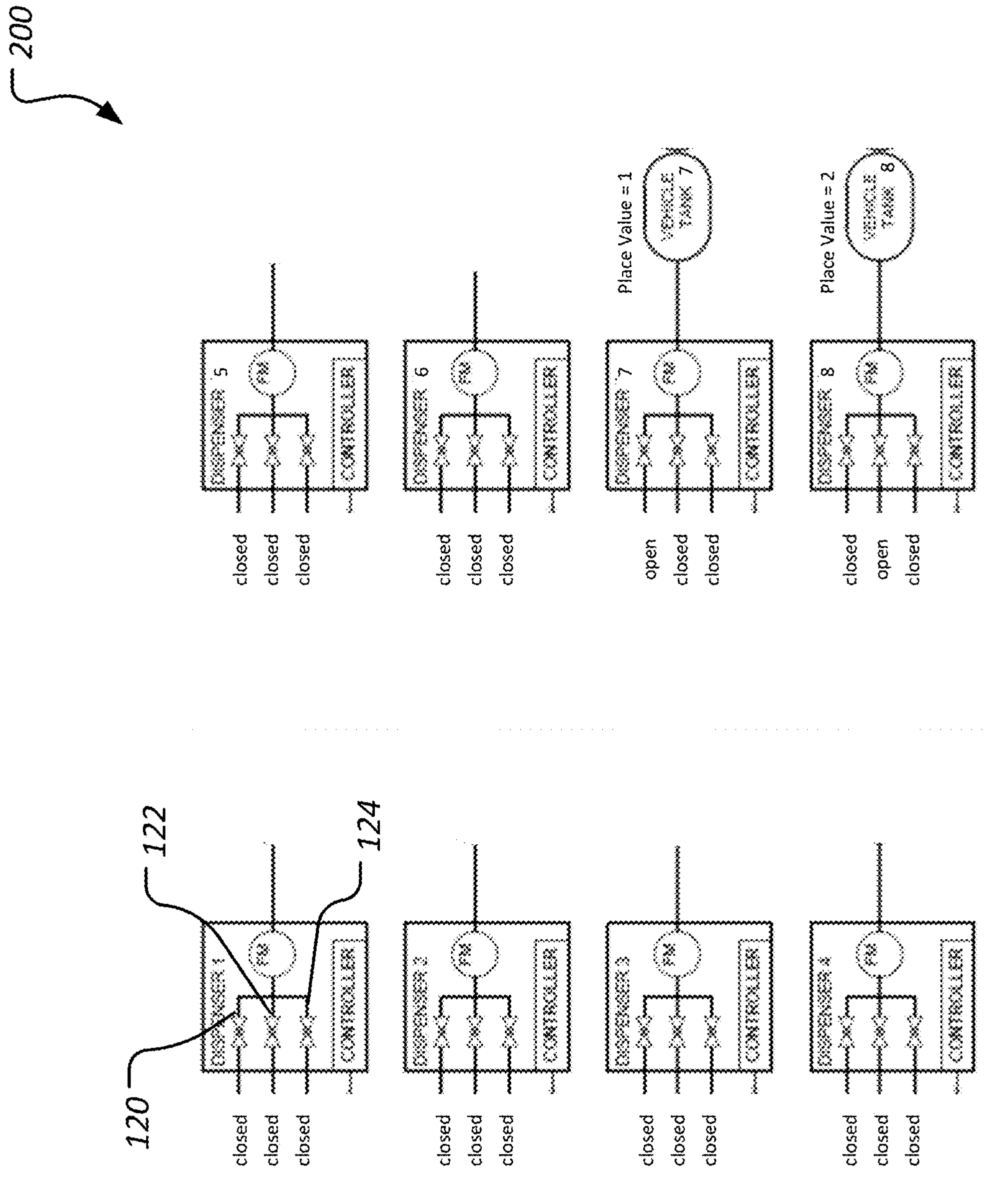

The display of site controller 128 of FIG. 16A and the physical layout of FIG. 16B show that the #6 vehicle tank has been filled with CNG or otherwise discontinued from the CNG filling process. In response, the site controller revises the integer place value of each of #7-#8 vehicle tanks by reducing the integer place values by subtracting 1. Accordingly, #7 vehicle tank is now assigned an integer place value of 1 and #8 vehicle tank is now assigned an integer place value of 2. As such, #7 vehicle tank is filled from any of the High storage tank, the Mid storage tank, and the Low storage tank while #8 vehicle tank is filled from either of the Mid storage tank and the Low storage tank.

Figure 17A:
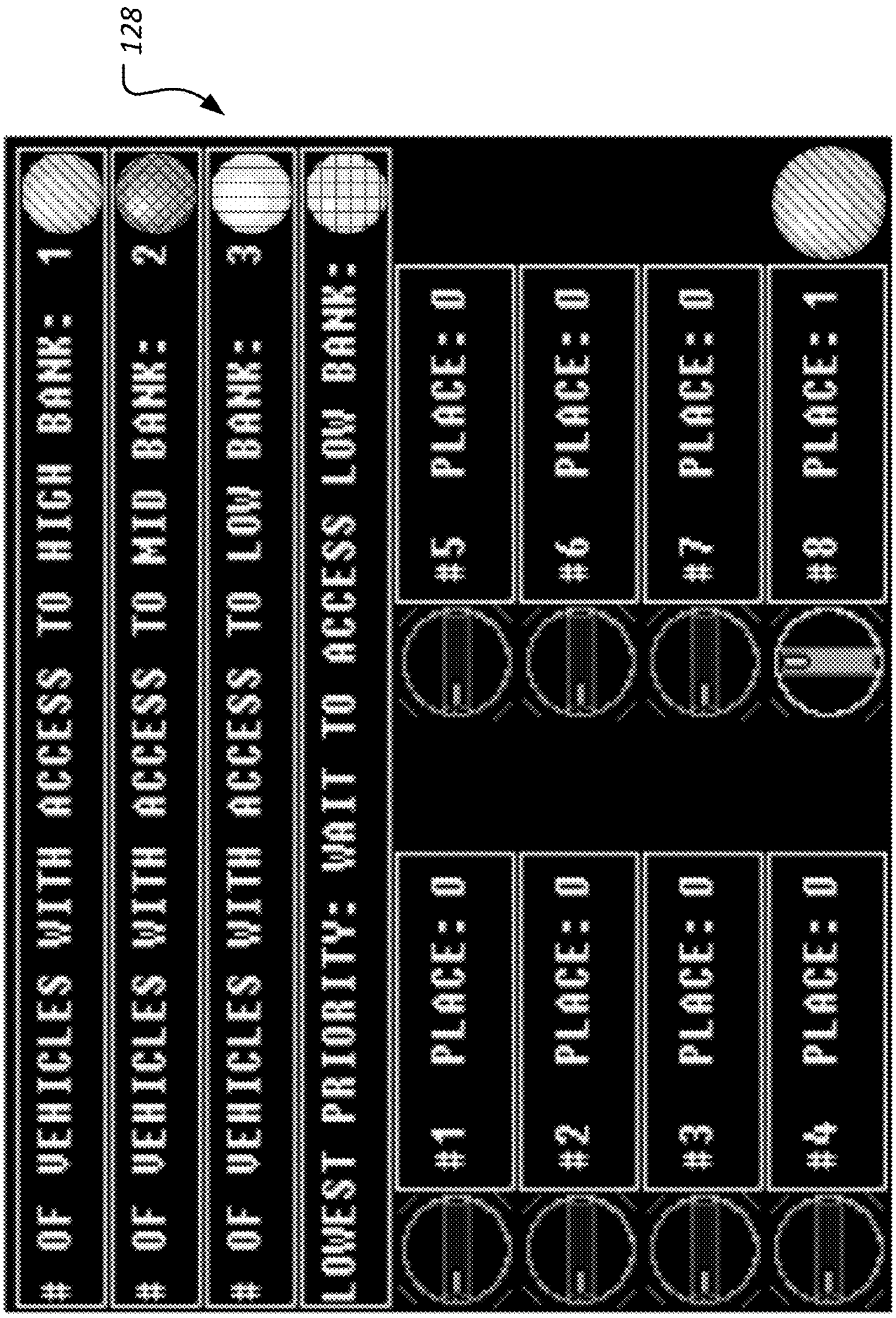
Figure 17B:
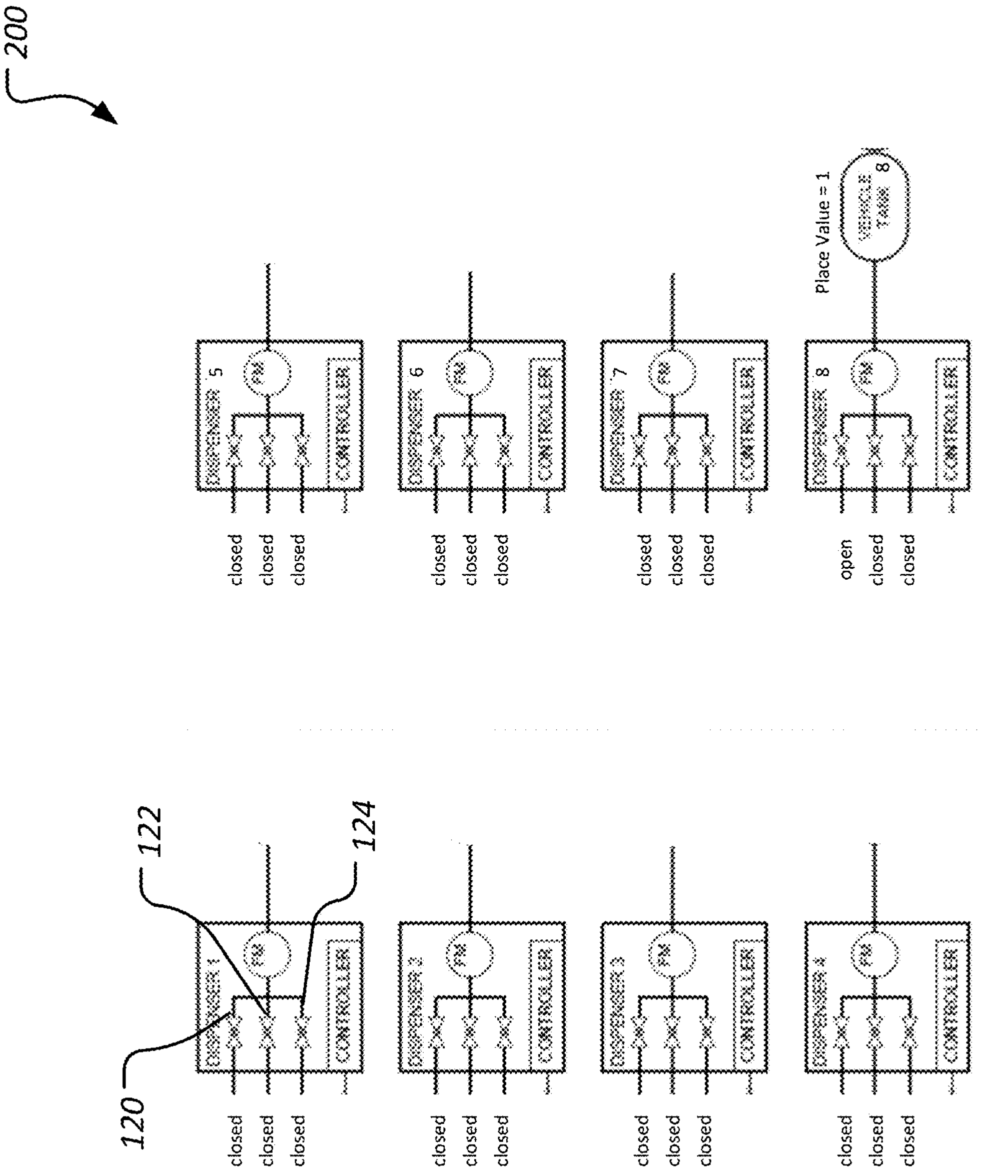

The display of site controller 128 of FIG. 17A and the physical layout of FIG. 17B show that the #7 vehicle tank has been filled with CNG or otherwise discontinued from the CNG filling process. In response, the site controller revises the integer place value of #8 vehicle tank by reducing the integer place value by subtracting 1. Accordingly, #8 vehicle tank is now assigned an integer place value of 1 is filled from any of the High storage tank, the Mid storage tank, and the Low storage tank. In the manner described above, completing the filling of earlier arriving vehicle tanks over later arriving vehicle tanks can be assured.

Figure 18A:
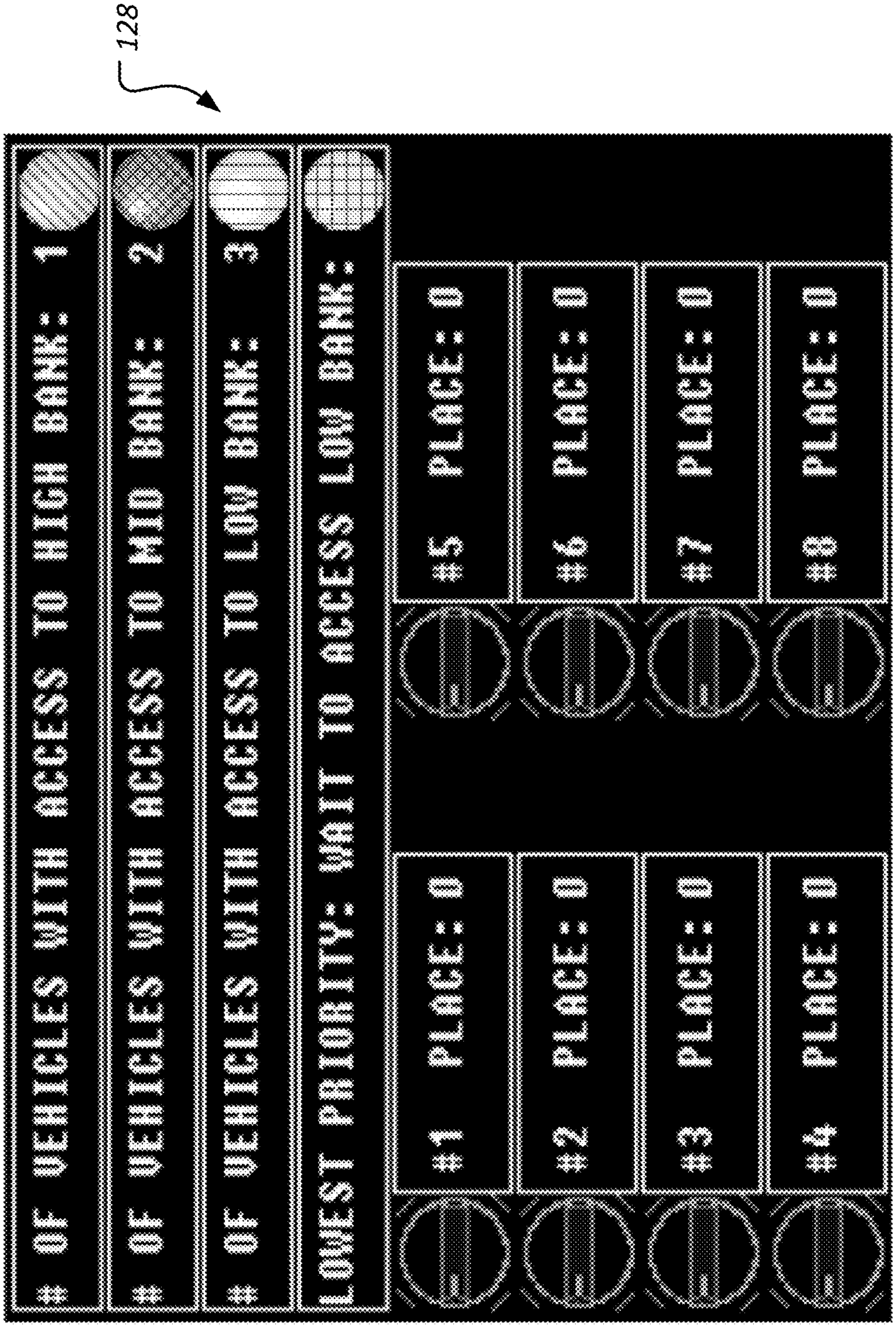
Figure 18B:
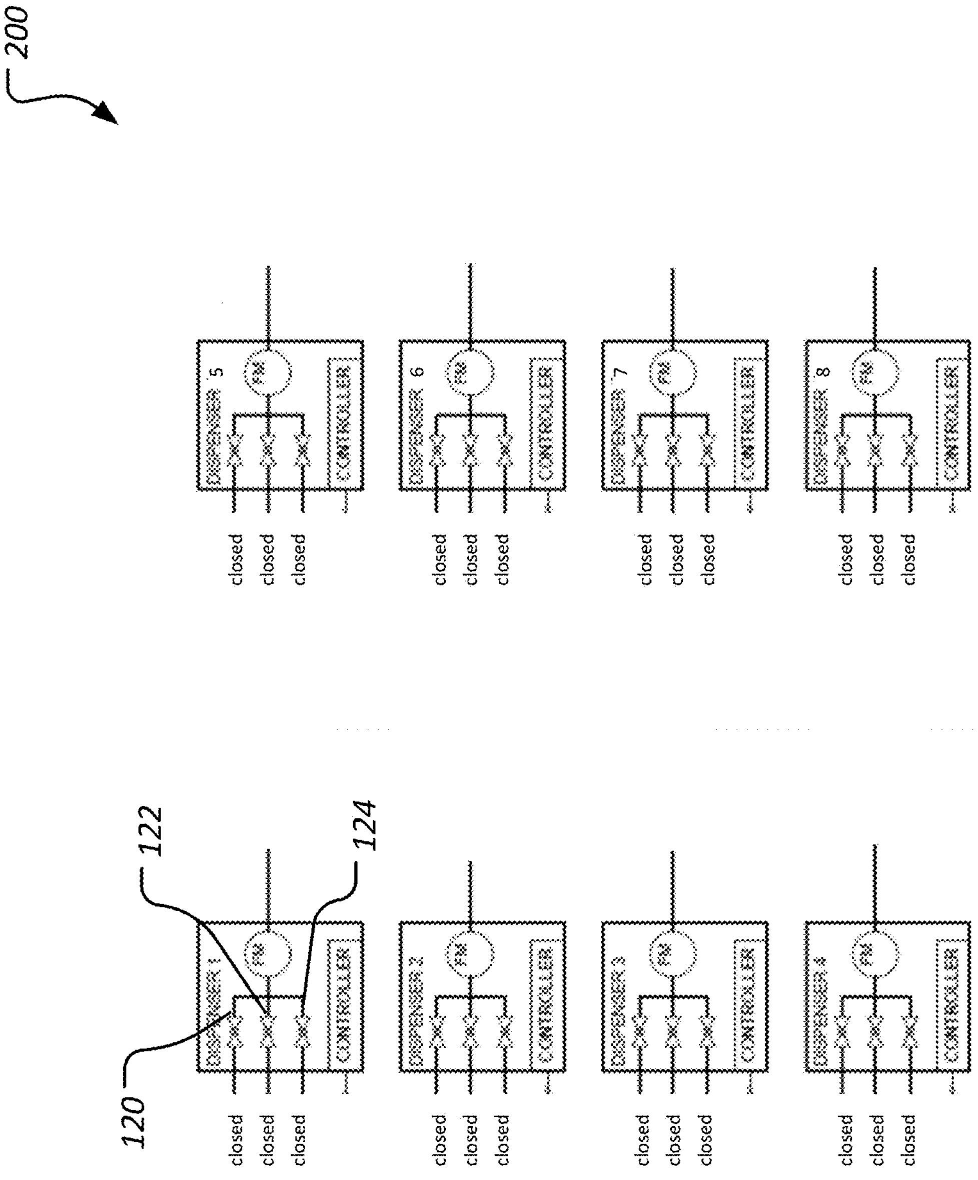

The display of site controller 128 of FIG. 18A and the physical layout of FIG. 18B show that the #8 vehicle tank has been filled with CNG or otherwise discontinued from the CNG filling process, placing the system 200 in the same state as it began in at FIGS. 2A and 2B.

It is contemplated that systems substantially similar to CNG dispensing system 100 can be provided with more or fewer compressors, more or fewer dispensers, dispensers, more or fewer storage tanks (having any combination of relative pressures), and more or fewer vehicle tanks connected to each dispenser. In some cases, the one or more compressors can comprise relative power ratings of less than ten horsepower to many thousands of horsepower, individually or collectively. As such, with greater compression capability and/or greater storage tank capacity, in some embodiments, multiple vehicle tanks may be assigned the same positive integer values so that, for example, multiple vehicle tanks could receive CNG from Low and/or Mid pressure storage tanks, and in some embodiment, multiple vehicle tanks can receive CNG from High pressure storage tanks. The rules for assigning priority and/or access to storage tanks can be changed to allow a vehicle storage tank to jump in line, finish simultaneously with other vehicle storage tanks, and/or otherwise deviate from the examples described above.

In a first example of a different priority scheme, a dispenser, as opposed to a vehicle tank, may be assigned a higher priority than all other vehicle tanks and dispenser so that a vehicle tank being filled from the dispenser assigned the higher priority will fill first and fastest. In some cases, a user may pay a higher price to access the higher priority dispenser. The higher priority dispenser may be referred to as a preferred dispenser or a premium price dispenser.

In a second example of a different priority scheme, a user may provide a code or present a card encoded to cooperate with the CNG filling system to elevate the dispenser being used by the user to a higher priority than some or all of the other destination tanks and/or dispensers. The higher priority user may be referred to as a preferred customer.

In a third example of a different priority scheme, a dispenser, when active, can be assigned a lowest priority. An illustrative use of this would be to assign a large capacity tube trailer a lower or lowest priority so that the site is not essentially shut down to other users while the tube trailer receives as many as several thousand gallons of CNG. By assigning the low priority to a dispenser used by tube trailers (or other large capacity destination tanks), other smaller destination tanks can effectively jump in priority over the tube trailer, potentially temporarily discontinuing filling the tube trailer, be filled, and thereafter the system can resume filling of the tube trailer once other filling demand is satisfied.

In a fourth example of a different priority scheme, dispensers can be configured to first estimate an amount of CNG that destination tanks need to be filled with at the beginning of the fill process (sometimes accomplished by measuring the information related to administering a "first shot" of CNG to the newly arrived destination tank). In some cases, the priority of a destination tank can be adjusted based on estimated amount of CNG needed. In other words, if the system is filling three vehicles with relatively large tanks (for instance, 100 gallons each), and a fourth vehicle connects and is determined to only need 10 gallons, the fourth vehicle with a lesser need of 10 gallons can be prioritized over the higher need vehicles.

In a fifth example of a different priority scheme, the system could assign priority based on current destination tank pressures. For example, if three vehicles are filling at 3000 psig, 2500 psig, and 2000 psig, respectively, a fourth vehicle that is at 3500 psig could be elevated in priority over the other three vehicles because completing the filling the fourth vehicle would be a relative quick process.

Figure 19:
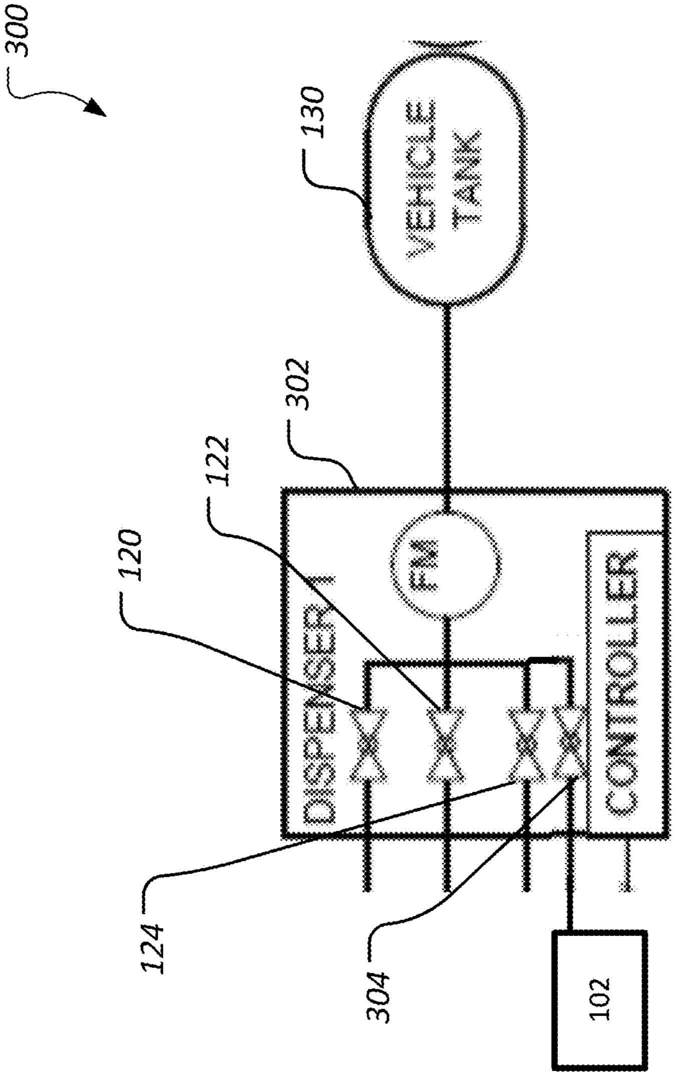
FIG. 19 shows a portion of an alternative embodiment of a dispenser, the dispenser comprising a direct fill valve.

Referring now to FIG. 19, a simplified schematic of a CNG dispensing system 300 is shown. The system 300 is substantially similar to systems 100 and 200, but further includes a dispenser 302 additionally comprising a direct fill valve 302 that controls fluid communication between a compressor 102 and a vehicle tank 130. When dispenser comprise a direct fill valve 302, the system can select between filling a vehicle tank form a compressor 102 rather than a High storage tank or any other storage tank as needed or desired.

Figure 20:
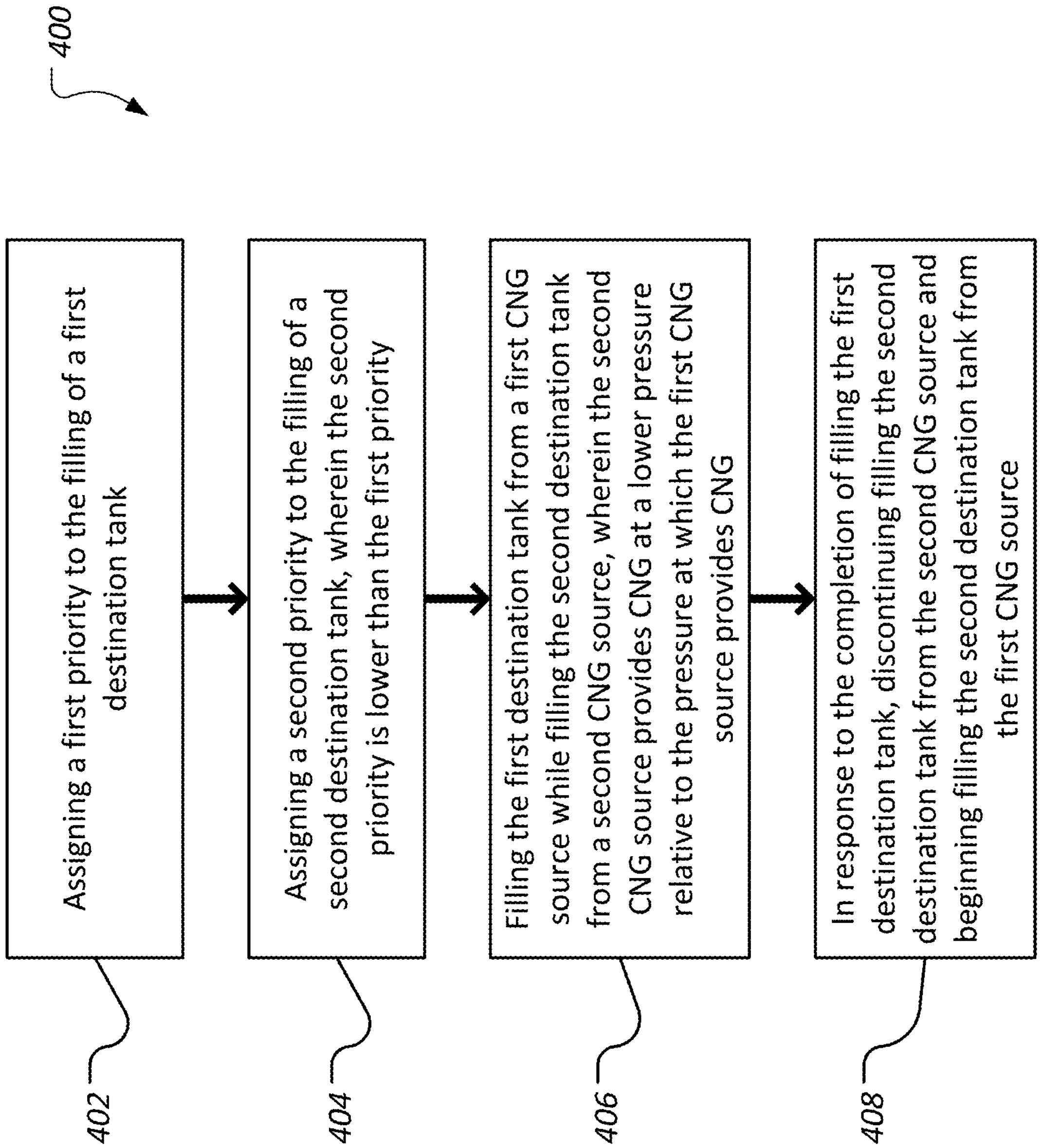
FIG. 20 shows a flowchart of a method of dispensing CNG.

Referring now to FIG. 20, a flowchart of a method 400 of dispensing CNG is shown. The method 400 can begin at block 402 by assigning a first priority to the filling of a first destination tank. In some cases, the first destination tank can be a vehicle tank 130. The method 400 can progress to block 404 and proceed by assigning a second priority to the filling of a second destination tank. In some embodiments, the second priority is lower than the first priority. The method 400 can progress to block 406 and proceed by filling the first destination tank from a first CNG source while filling the second destination tank from a second CNG source. In some embodiments, the second CNG source provides CNG at a lower pressure relative to the pressure at which the first CNG source provides CNG. The method 400 can progress to block 408 and proceed by, in response to the completion of the filling the first destination tank, discontinuing filling the second destination tank from the second CNG source and beginning filling the second destination tank from the first CNG source. It will be appreciated that the CNG sources can comprise storage tanks, such as tanks 106, 108, and/or 110 and destination tanks can comprise vehicle tanks 130, portable tanks, and/or mobile trailer tanks (such as large capacity tube trailer tanks).

Figure 21:
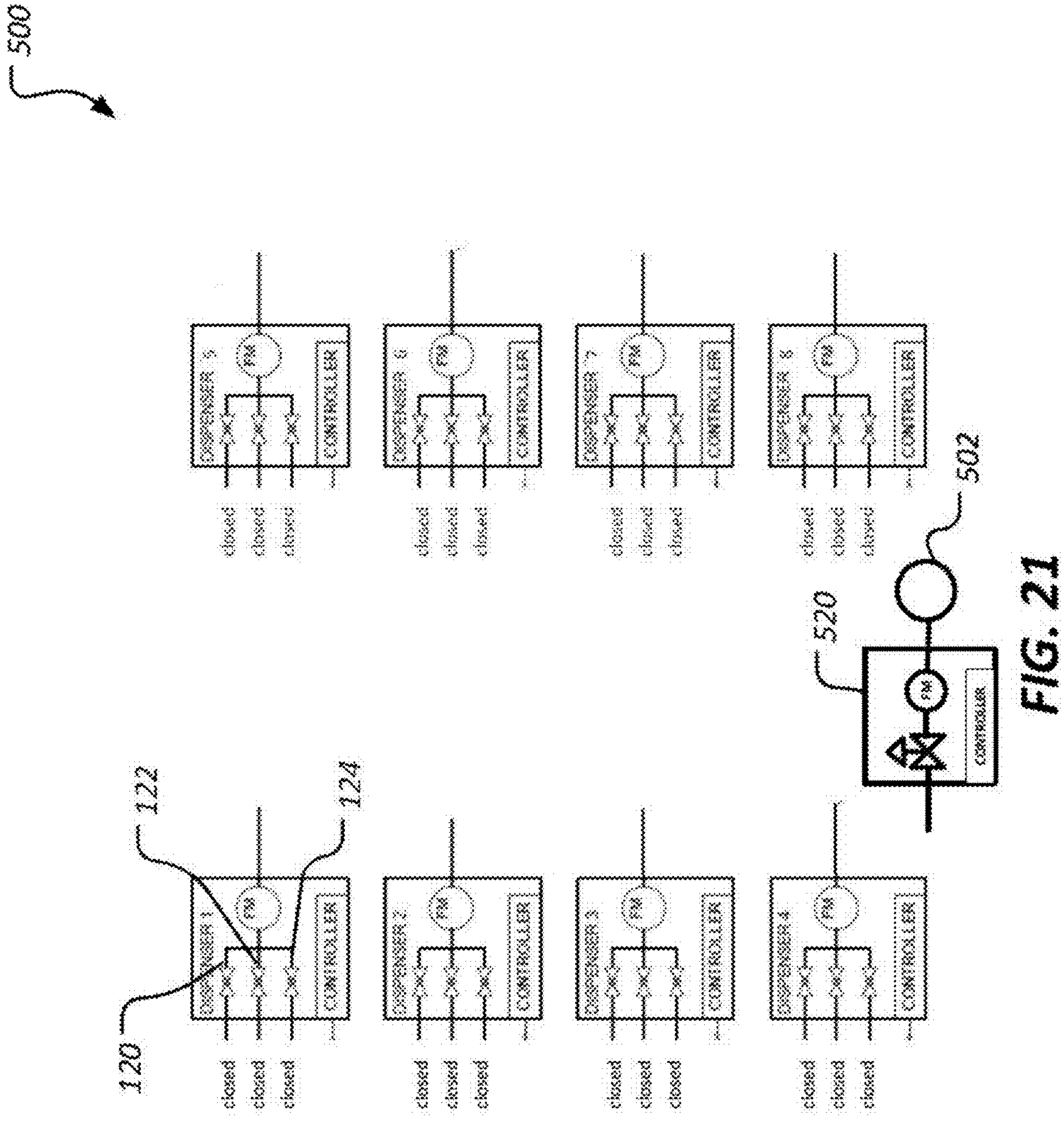
FIG. 21 is a schematic diagram of another CNG dispensing system according to an embodiment of the disclosure.

Referring now to FIG. 21, an alternative embodiment of a CNG dispensing system 500 is shown. CNG dispensing system 500 is substantially similar to CNG dispensing system 200 but additionally comprises a control valve 520. In operation, CNG dispensing system 500 can be used to fill a relatively large capacity tank 502, for example, a tank of a tube trailer configured to transport large amounts of CNG for delivery elsewhere. Considering that the CNG dispensing system 500 can primarily be configured for filling vehicle tanks 130 of passenger vehicles, the large capacity tank 502 can take significantly more time to be filled than other vehicle tanks. For example, a tube trailer can hold 1000-2000 gallons of CNG. Assuming a flow rate of the compression is 5 gallons per minute, it could easily take over 3 hours to fill the large capacity tank 502. Conventional systems and even CNG dispensing system 200 would not be able to fill any tanks other than the large capacity tank 502 while the large capacity tank 502 is being filled. This is because once the large capacity tank 502 of the tube trailer reaches first priority in CNG dispensing system 200, no other vehicles will finish being filled until after the large capacity tank 502. In practice, this could be mitigated by pausing filling of the large capacity tank 502 while other vehicles are filling and to then restart the filling process for the large capacity tank 502.

In operation and starting with the system 500 not filling, assume that a tube trailer starts filling at the additional dispenser (valve 520). Being the only vehicle, it would be placed into priority 1 and the valve 520 would fully open allowing gas to flow to the large capacity tank 502. While this is happening, when another vehicle pulls up to dispenser 1 and authorizes, filling vehicle tank would begin as priority 2, begin filling, having access to banks 2 and 3. When it becomes times to switch to bank 1, it will be promoted to priority 1, along with the large capacity tank 502 of the tube trailer. With both of the vehicles on bank 1, valve 520 is configured to modulate to drive up the pressure on the bank 1. This will limit flow to the large capacity tank 502 of tube trailer and allow some of the gas to go to the vehicle on dispenser 1. As vehicle 1 nears the end of the fill, valve 520 will need to modulate (open) to maintain pressure in the manifold. This will allow more gas into the large capacity tank 502. Once vehicle 1 is finished filling, valve 520 will go wide open and continue to fill the trailer's large capacity tank 502. At any point during the filling, the trailer dispenser (valve 520) will modulate to ensure that priority 1 gets gas flow without completely stopping flow to the large capacity tank 502.

Figure 22:
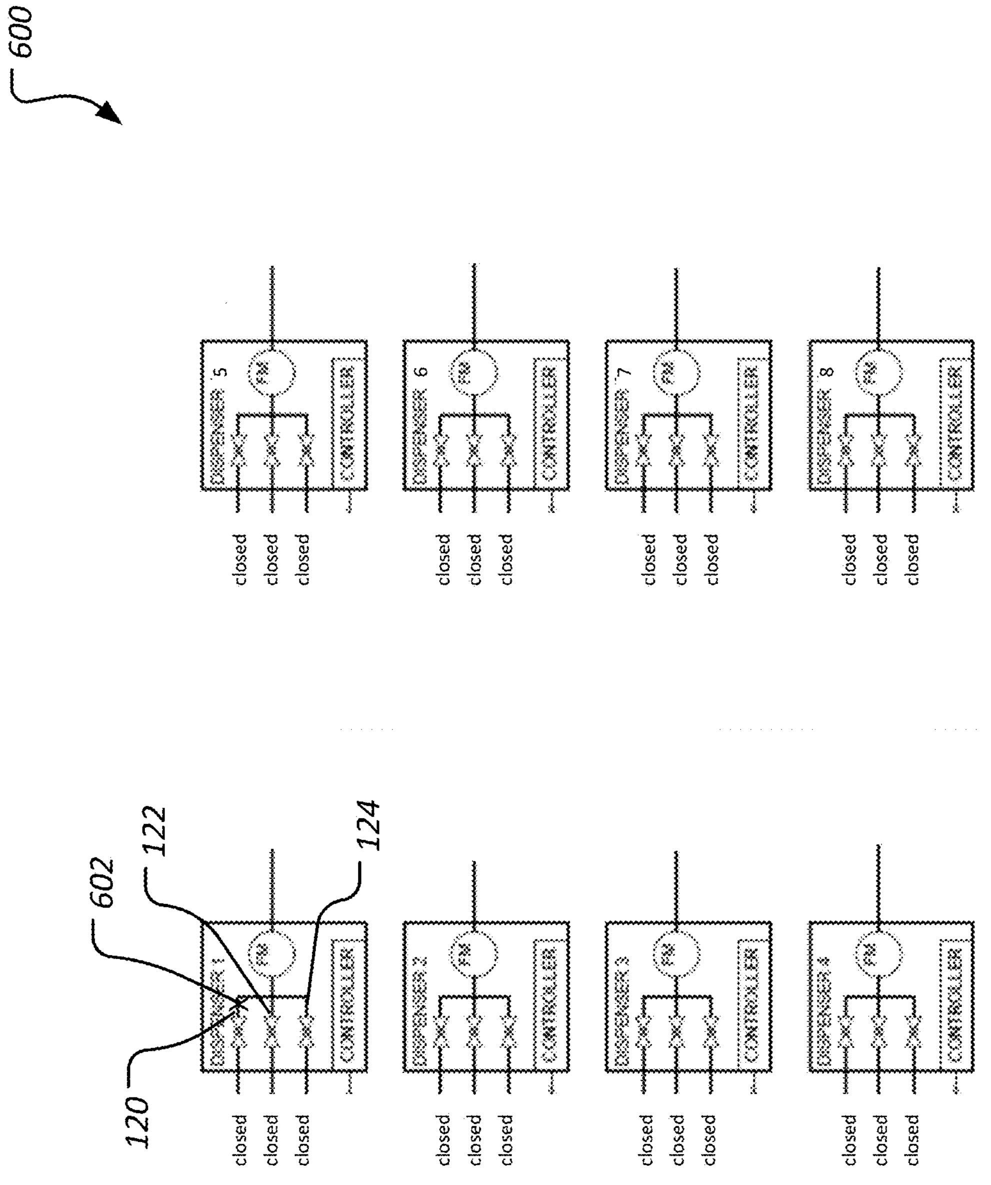
FIG. 22 is a schematic diagram of another CNG dispensing system according to an embodiment of the disclosure.

Referring now to FIG. 22, a CNG dispensing system 600 is shown with a valve 602 substantially similar to valve 520 added to dispenser 1, in series with valve 120. The addition of valve 602 allows operation of dispenser 1 in a manner substantially similar to the dispenser housing valve 520.

Figure 23:
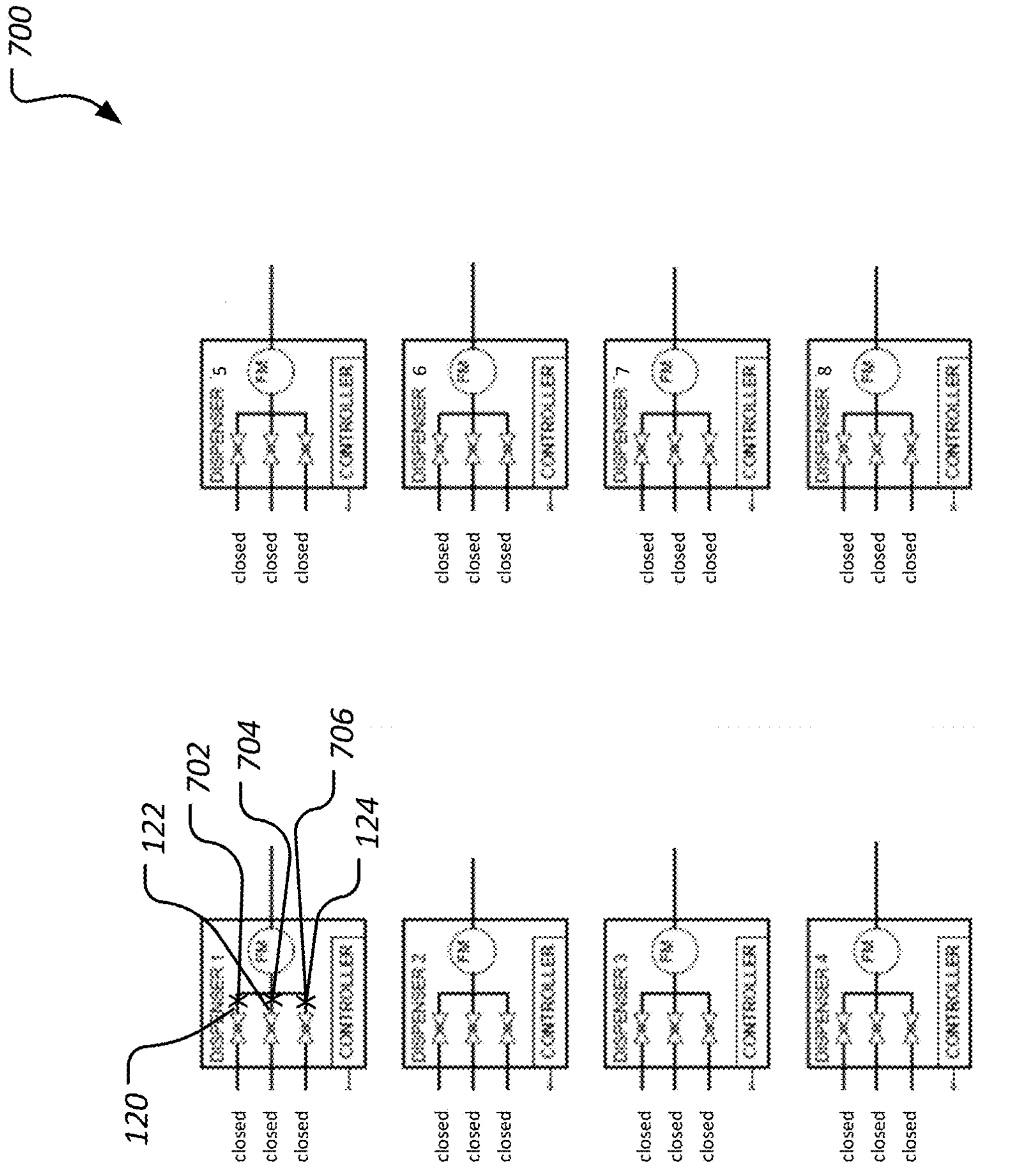
FIG. 23 is a schematic diagram of another CNG dispensing system according to an embodiment of the disclosure.

Referring now to FIG. 23, a CNG dispensing system 700 is shown with three control valves, 702, 704, 706 added to dispenser 1, in series with valve 120, 122, 124. This enables the filling methodology as described above to work not only on bank 1, but also bank 2 and bank 3.

Figure 24:
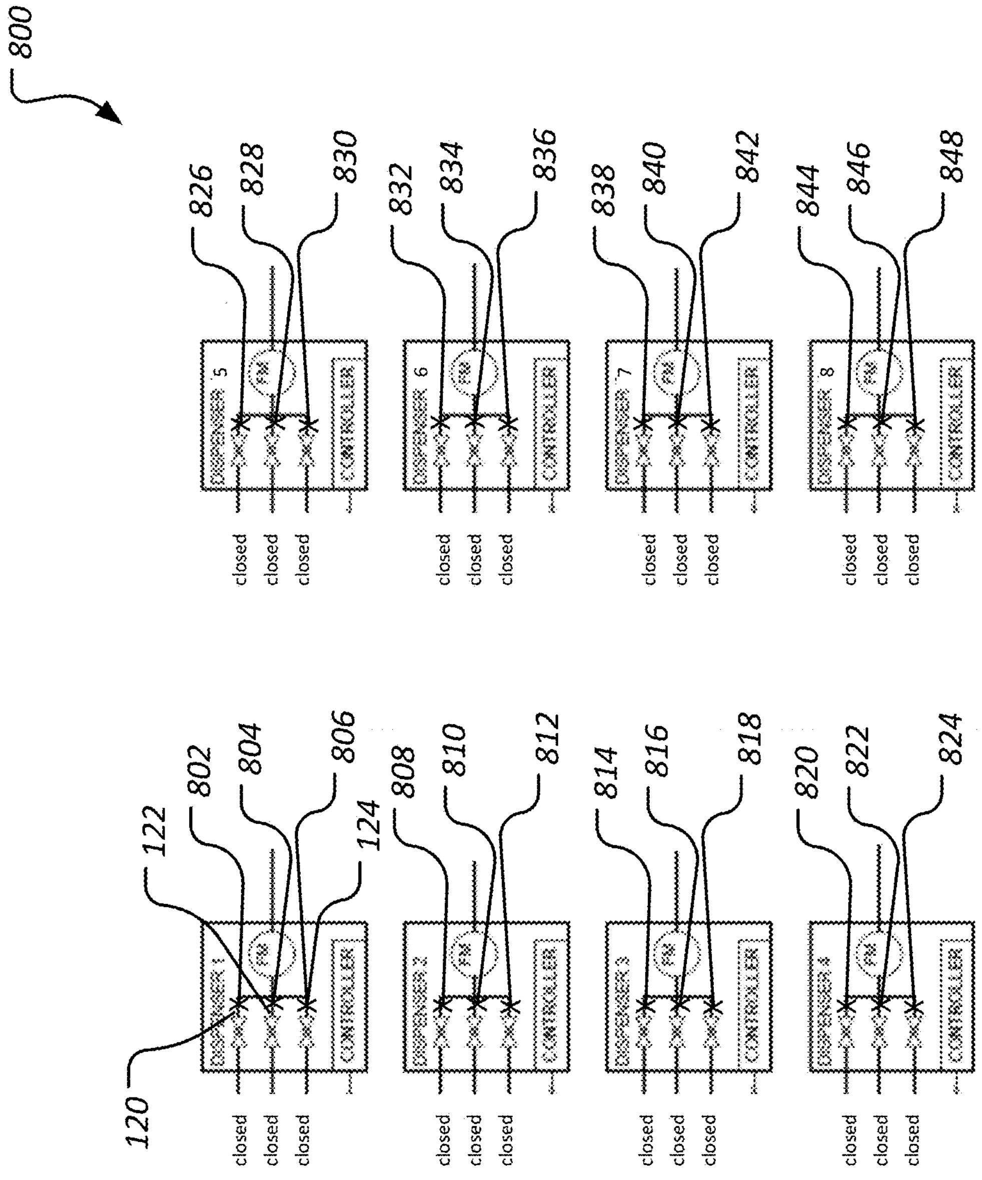
FIG. 24 is a schematic diagram of another CNG dispensing system according to an embodiment of the disclosure.

Referring now to FIG. 24, a CNG dispensing system 800 is shown with control valves added to all banks of all of the dispensers, allowing each dispenser to have the functionality described above.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, Rl, and an upper limit, Ru, is disclosed, any number falling within the range is specifically disclosed. In particular, the following numbers within the range are specifically disclosed: R=Rl+k*(Ru−Rl), wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention.

What is claimed is:

1. A method of dispensing compressed natural gas (CNG), comprising:

assigning a first priority to the filling of a first destination tank;

assigning a second priority to the filling of a second destination tank, wherein the second priority is lower than the first priority; and reducing a rate of filling the first destination tank as a function of the first destination tank comprising a higher capacity as compared to the second destination tank; and wherein a first dispenser comprises a valve configured for selective modulation to an intermediate flow position between a fully closed position and a fully open position; and wherein the first dispenser is configured to dispense CNG through the valve with the valve at the intermediate flow position while a second dispenser is configured to dispense CNG.

2. The method of claim 1, further comprising:

in response to the completion of filling the first destination tank, discontinuing filling the second destination tank from the second CNG source and beginning filling the second destination tank from the first CNG source.

3. The method of claim 1, wherein the first CNG source and the second CNG source are both storage tanks.

4. The method of claim 1, wherein at least one of the first CNG source and the second CNG source is a compressor.

5. The method of claim 1, wherein at least one of the first destination tank and the second destination tank is a vehicle tank.

6. The method of claim 1, wherein at least one of the first destination tank and the second destination tank is a mobile trailer tank.

7. The method of claim 1, further comprising:

assigning a third priority to the filling of a third destination tank.

8. The method of claim 7, wherein the third priority is lower than the second priority.

9. The method of claim 8, further comprising:

filling the third destination tank from a third CNG source while filling the second destination tank from the second CNG source, wherein the third CNG source provides CNG at a lower pressure relative to the pressure at which the second CNG source provides CNG.

10. A compressed natural gas (CNG) dispensing system, comprising:

a first CNG source;

a second CNG source;

a first dispenser comprising a valve configured for selective modulation to an intermediate flow position between a fully closed position and a fully open position;

a second dispenser; and a controller, the controller configured to (1) assign a first priority to the filling of a first destination tank associated with the first dispenser, (2) assign a second priority to the filling of a second destination tank associated with the second dispenser, wherein the second priority is lower than the first priority, and (3) reduce a rate of filling the first destination tank as a function of the first destination tank comprising a higher capacity as compared to the second destination tank;

wherein the first dispenser is configured to dispense CNG through the valve with the valve at the intermediate flow position while the second dispenser is configured to dispense CNG.

11. The system of claim 10, wherein, in response to the completion of filling the first destination tank, discontinuing filling the second destination tank from the second CNG source and beginning filling the second destination tank from the first CNG source.

12. The system of claim 10, wherein the first CNG source and the second CNG source are both storage tanks.

13. The system of claim 10, wherein at least one of the first CNG source and the second CNG source is a compressor.

14. The system of claim 10, wherein at least one of the first destination tank and the second destination tank is a vehicle tank.

15. The system of claim 10, wherein at least one of the first destination tank and the second destination tank is a mobile trailer tank.

16. The system of claim 10, wherein the controller is further configured to assign a third priority to the filling of a third destination tank.

17. The system of claim 16, wherein the third priority is lower than the second priority.

18. The system of claim 17, further comprising:

filling the third destination tank from a third CNG source while filling the second destination tank from the second CNG source, wherein the third CNG source provides CNG at a lower pressure relative to the pressure at which the second CNG source provides CNG.

* * * * *